United States Patent
Adelman et al.

(10) Patent No.: US 8,616,422 B2
(45) Date of Patent: Dec. 31, 2013

(54) CANTILEVERED SNAP FIT CASE

(76) Inventors: Greg Adelman, Boulder, CO (US);
William R. Brennan, Jr., Longmont, CO (US); Richard N. Case, Boulder, CO (US)

( * ) Notice: Subject to any disclaimer, the term of this patent is extended or adjusted under 35 U.S.C. 154(b) by 175 days.

(21) Appl. No.: 13/196,762

(22) Filed: Aug. 2, 2011

(65) Prior Publication Data

US 2013/0032617 A1   Feb. 7, 2013

(51) Int. Cl.
*A45F 5/00* (2006.01)

(52) U.S. Cl.
USPC ...... 224/191; 224/930; 455/575.8; 312/223.1

(58) Field of Classification Search
USPC .................. 224/191, 929–930; 312/223.1; 455/575.8; D3/218
See application file for complete search history.

(56) References Cited

U.S. PATENT DOCUMENTS

| | | |
|---|---|---|
| 757,820 A | 4/1904 | Lykke |
| 1,251,778 A | 1/1918 | Humble |
| 1,407,406 A | 2/1922 | Glazebrook |
| 2,118,875 A | 5/1938 | Windheim |
| 2,530,695 A | 11/1950 | Helmert |
| 2,542,601 A | 2/1951 | Van Cleef |
| 3,214,309 A | 10/1965 | Di Leo et al. |
| 3,257,054 A | 6/1966 | Miesel |
| 3,426,393 A | 2/1969 | Mead |
| 3,543,353 A | 12/1970 | Meehan |
| 3,564,667 A | 2/1971 | Parrick, III et al. |
| 3,757,429 A | 9/1973 | Sumino |
| 3,768,711 A | 10/1973 | Wilkinson |
| 3,806,358 A | 4/1974 | Glander et al. |
| 3,930,288 A | 1/1976 | Black et al. |
| 3,947,927 A | 4/1976 | Rosenthal |
| 3,960,302 A | 6/1976 | Mazzoni, Jr. |
| 3,997,945 A | 12/1976 | Robins |
| 4,015,762 A | 4/1977 | Mendillo |
| 4,120,437 A | 10/1978 | Hara |
| 4,463,885 A | 8/1984 | Ball et al. |
| 4,483,470 A | 11/1984 | Cousins |
| 4,484,378 A | 11/1984 | Kimura et al. |
| 4,488,748 A | 12/1984 | Burkes |

(Continued)

FOREIGN PATENT DOCUMENTS

KR   100988204 B1   10/2010

OTHER PUBLICATIONS

U.S. Appl. No. 12/247,523 Non-Final Office Action dated Jan. 31, 2012, 7 pages.

(Continued)

*Primary Examiner* — Nathan J Newhouse
*Assistant Examiner* — Scott McNurlen
(74) *Attorney, Agent, or Firm* — Patton Boggs LLP

(57) ABSTRACT

A case for holding an electronic device includes a body having a void for holding the electronic device. The void approximately replicates the shape of the electronic device such that a face of the electronic device is not substantially surrounded by the body. The body has tabs configured to contact a portion of the face of the electronic device and hold the electronic device in the void such that it is held in place. The body has a flexible body portion, the flexible body portion defined by a cut in the body, dividing the body into a hinge portion and a main body. The hinge portion is configured to be flexed away from the main body to provide a direction that the electronic device is slidably removed.

18 Claims, 32 Drawing Sheets

(56) References Cited

U.S. PATENT DOCUMENTS

| | | | |
|---|---|---|---|
| 4,531,661 A | 7/1985 | Santy | |
| 4,540,006 A | 9/1985 | Collis | |
| 4,553,779 A | 11/1985 | Shortridge | |
| 4,641,454 A | 2/1987 | Ray et al. | |
| 4,648,414 A | 3/1987 | Fox et al. | |
| 4,666,417 A | 5/1987 | Hillman | |
| 4,753,355 A | 6/1988 | Hall et al. | |
| 4,761,053 A | 8/1988 | Cogelia et al. | |
| 4,817,837 A | 4/1989 | Grover | |
| 4,834,118 A | 5/1989 | Goeller | |
| 4,856,689 A | 8/1989 | Shore | |
| 4,867,478 A | 9/1989 | Anderson | |
| 4,915,996 A | 4/1990 | Curry | |
| D308,205 S | 5/1990 | Tholberg | |
| D310,909 S | 10/1990 | Bradtl | |
| 5,054,299 A | 10/1991 | Maveety | |
| 5,056,820 A | 10/1991 | Des Prez | |
| 5,104,017 A | 4/1992 | Vandagriff | |
| 5,190,336 A | 3/1993 | Palz | |
| 5,199,135 A | 4/1993 | Gold | |
| 5,234,370 A | 8/1993 | Shapero et al. | |
| 5,310,376 A | 5/1994 | Mayuzumi et al. | |
| D354,620 S * | 1/1995 | King et al. | D3/218 |
| 5,437,401 A | 8/1995 | Seltzer | |
| 5,468,036 A | 11/1995 | Brown | |
| 5,498,190 A | 3/1996 | Ganson | |
| 5,590,422 A | 1/1997 | Henderson | |
| D377,798 S | 2/1997 | Heine | |
| D379,542 S | 5/1997 | Egashira | |
| 5,664,589 A | 9/1997 | Black | |
| 5,711,143 A | 1/1998 | Munakata et al. | |
| 5,714,211 A | 2/1998 | Zinbarg et al. | |
| 5,769,994 A | 6/1998 | Booz et al. | |
| D399,021 S | 9/1998 | Lam | |
| 5,853,212 A | 12/1998 | Daniel | |
| 5,916,006 A | 6/1999 | Ganson | |
| D425,226 S | 5/2000 | Galli | |
| D426,235 S | 6/2000 | Phirippidis et al. | |
| 6,081,695 A * | 6/2000 | Wallace et al. | 455/575.6 |
| 6,105,923 A | 8/2000 | Robertson et al. | |
| 6,113,170 A | 9/2000 | Daniel | |
| 6,114,036 A | 9/2000 | Rinehart et al. | |
| D438,536 S | 3/2001 | Willison et al. | |
| 6,206,187 B1 * | 3/2001 | Van Winkle | 206/320 |
| 6,206,542 B1 | 3/2001 | Case et al. | |
| 6,237,740 B1 | 5/2001 | Weatherall et al. | |
| 6,332,052 B1 | 12/2001 | Luther et al. | |
| D455,815 S | 4/2002 | Bonzer | |
| 6,372,344 B1 | 4/2002 | Castellani et al. | |
| 6,473,944 B1 | 11/2002 | Vazin | |
| 6,478,282 B1 | 11/2002 | Flemming | |
| D466,287 S * | 12/2002 | Tanaka | D3/218 |
| 6,563,927 B2 | 5/2003 | Mote et al. | |
| 6,742,685 B2 * | 6/2004 | Williams | 224/197 |
| D493,280 S | 7/2004 | Tabata | |
| D499,546 S | 12/2004 | Smithers | |
| 6,848,663 B2 | 2/2005 | Olive | |
| D508,605 S * | 8/2005 | Hwang et al. | D3/218 |
| 7,011,879 B1 | 3/2006 | Contreras et al. | |
| D528,539 S * | 9/2006 | McClaude | D14/253 |
| D531,339 S | 10/2006 | Lee et al. | |
| 7,123,801 B2 | 10/2006 | Fitz | |
| D533,994 S | 12/2006 | Hussaini et al. | |
| D534,004 S | 12/2006 | Waniga | |
| D536,116 S | 1/2007 | Sharrah | |
| 7,192,069 B1 | 3/2007 | Daniel | |
| 7,250,213 B2 | 7/2007 | Duncan | |
| D565,290 S | 4/2008 | Brandenburg et al. | |
| 7,357,540 B2 | 4/2008 | Booty, Jr. | |
| 7,377,828 B2 | 5/2008 | Cheung | |
| D574,819 S | 8/2008 | Andre et al. | |
| D586,795 S | 2/2009 | Richter | |
| D588,735 S | 3/2009 | Woodard | |
| D592,341 S | 5/2009 | Fan | |
| D593,750 S | 6/2009 | Song | |
| D594,224 S * | 6/2009 | Leung et al. | D3/218 |
| D597,298 S | 8/2009 | Lown et al. | |
| D600,852 S | 9/2009 | Clepper et al. | |
| 7,609,512 B2 | 10/2009 | Richardson et al. | |
| D603,603 S | 11/2009 | Laine et al. | |
| D606,311 S | 12/2009 | Lown et al. | |
| D606,739 S | 12/2009 | Fahrendorff et al. | |
| 7,630,745 B2 * | 12/2009 | Chen et al. | 455/575.8 |
| D609,226 S | 2/2010 | Hofer et al. | |
| D609,460 S | 2/2010 | Riccardi | |
| D609,853 S | 2/2010 | Salatto-Rose | |
| D610,135 S | 2/2010 | Hofer et al. | |
| 7,661,620 B2 | 2/2010 | Fields | |
| 7,683,275 B2 | 3/2010 | Moore et al. | |
| D613,498 S | 4/2010 | Tsai | |
| D614,402 S | 4/2010 | Lown et al. | |
| D615,078 S | 5/2010 | Bradley | |
| D617,093 S | 6/2010 | Pedersen et al. | |
| D619,361 S | 7/2010 | Andre et al. | |
| 7,757,913 B2 * | 7/2010 | Fichera | 224/197 |
| D620,931 S | 8/2010 | Opman | |
| D622,429 S | 8/2010 | Jones | |
| D623,180 S | 9/2010 | Diebel | |
| D625,303 S | 10/2010 | Kim | |
| D628,534 S | 12/2010 | Daniel | |
| D635,555 S | 4/2011 | Giles | |
| D638,005 S | 5/2011 | Richardson et al. | |
| D638,828 S | 5/2011 | Melanson et al. | |
| 7,980,435 B2 | 7/2011 | Tages | |
| D643,029 S | 8/2011 | Feng | |
| D644,168 S | 8/2011 | Bishay et al. | |
| D644,428 S | 9/2011 | Feng | |
| 8,033,678 B2 | 10/2011 | Patterson | |
| D648,332 S | 11/2011 | Kim et al. | |
| D649,347 S * | 11/2011 | Smith et al. | D3/218 |
| D649,537 S | 11/2011 | Magness et al. | |
| D649,539 S | 11/2011 | Hong | |
| D650,371 S | 12/2011 | Wibby et al. | |
| D651,204 S | 12/2011 | Wibby et al. | |
| D652,825 S | 1/2012 | Bau | |
| D654,069 S | 2/2012 | Kwon et al. | |
| D654,914 S | 2/2012 | Martin | |
| D655,081 S | 3/2012 | Maravilla et al. | |
| D657,782 S | 4/2012 | Biller | |
| D658,169 S | 4/2012 | Mo | |
| 8,204,561 B2 * | 6/2012 | Mongan et al. | 455/575.8 |
| D662,925 S | 7/2012 | Mayberry et al. | |
| D663,263 S | 7/2012 | Gupta et al. | |
| D663,725 S | 7/2012 | Polito | |
| D669,062 S | 10/2012 | Rothbaum et al. | |
| D669,618 S | 10/2012 | Ormsbee et al. | |
| D669,619 S | 10/2012 | Ormsbee et al. | |
| 8,286,789 B2 | 10/2012 | Wilson et al. | |
| 8,297,440 B2 | 10/2012 | Schmidt et al. | |
| D670,279 S | 11/2012 | Veltz et al. | |
| 2002/0028336 A1 | 3/2002 | Jaccoud | |
| 2002/0118535 A1 | 8/2002 | Nostrant | |
| 2003/0019894 A1 | 1/2003 | Caldana | |
| 2003/0103624 A1 | 6/2003 | Hu | |
| 2005/0093205 A1 | 5/2005 | Martin et al. | |
| 2005/0211357 A1 | 9/2005 | Ren | |
| 2005/0274211 A1 | 12/2005 | Edgman | |
| 2006/0058070 A1 * | 3/2006 | Chang | 455/569.1 |
| 2008/0096620 A1 | 4/2008 | Lee et al. | |
| 2008/0124544 A1 | 5/2008 | Alexander et al. | |
| 2008/0254281 A1 | 10/2008 | Chen et al. | |
| 2009/0000086 A1 | 1/2009 | Bing | |
| 2009/0095854 A1 | 4/2009 | Forbes et al. | |
| 2009/0140016 A1 | 6/2009 | Case et al. | |
| 2010/0021155 A1 | 1/2010 | Orzeck et al. | |
| 2010/0203931 A1 * | 8/2010 | Hynecek et al. | 455/575.8 |
| 2010/0224519 A1 | 9/2010 | Kao | |
| 2010/0294908 A1 | 11/2010 | Mish et al. | |
| 2010/0300909 A1 * | 12/2010 | Hung | 206/320 |
| 2011/0031287 A1 | 2/2011 | Le Gette et al. | |
| 2011/0228459 A1 * | 9/2011 | Richardson et al. | 361/679.01 |
| 2011/0286217 A1 | 11/2011 | Martinson et al. | |

(56) References Cited

U.S. PATENT DOCUMENTS

OTHER PUBLICATIONS

U.S. Appl. No. 12/247,523 Non-Final Office Action dated Jul. 13, 2011, 9 pages.
ACOR, ACOR present Volara 4E, Mar. 2, 2008; http://acor.com/volara.htm.
International Search Report dated Dec. 9, 2011, in related PCT Application No. PCT/US2011/046304, 3 pages.
Web page illustration from web site illustrating Grip Twist lock and carry device; griptwist.com; Dakota Trading corporation, 2008.
Web page illustration from web site illustrating reusable silicone coated Sili Twists; www.wrapables.com; Wrapables, 2008.
In U.S. Appl. No. 12/247,523 Final Office Action dated Aug. 16, 2012, 11 pages.
Acor Volara 4E foam padding, <URL:http://www.acor.com/volara.htm>, retrieved from Internet on Nov. 15, 2012.
Cruzerlite Razr Maxx case review, posted on Oct. 3, 2012, <URL:http://forums.androidcentral.com/droid-razr-maxx/213784-cruzerlite-razr-maxx-case-review.html>, retrieved from Internet on Nov. 14, 2012.
International Search Report dated Oct. 18, 2012, in co-pending PCT Application No. PCT/US12/49309, 4 pages.
Nite Ize Connect Case for iPhone, Published on Aug. 17, 2012, by Nite Ize, Inc. <URL:http://www.youtube.com/watch?v=4LDiXufkDgY>, retrieved from Internet on Nov. 14, 2012.
Nite Ize Connect Mobile Mount, Posted Aug. 10, 2012, by Daniel Turk,<URL:http://www.maclife.com/article/reviews/best_case_scenario_nite_ize_connect_case_and_mobile_mount>, retrieved from Internet on Nov. 14, 2012.

\* cited by examiner

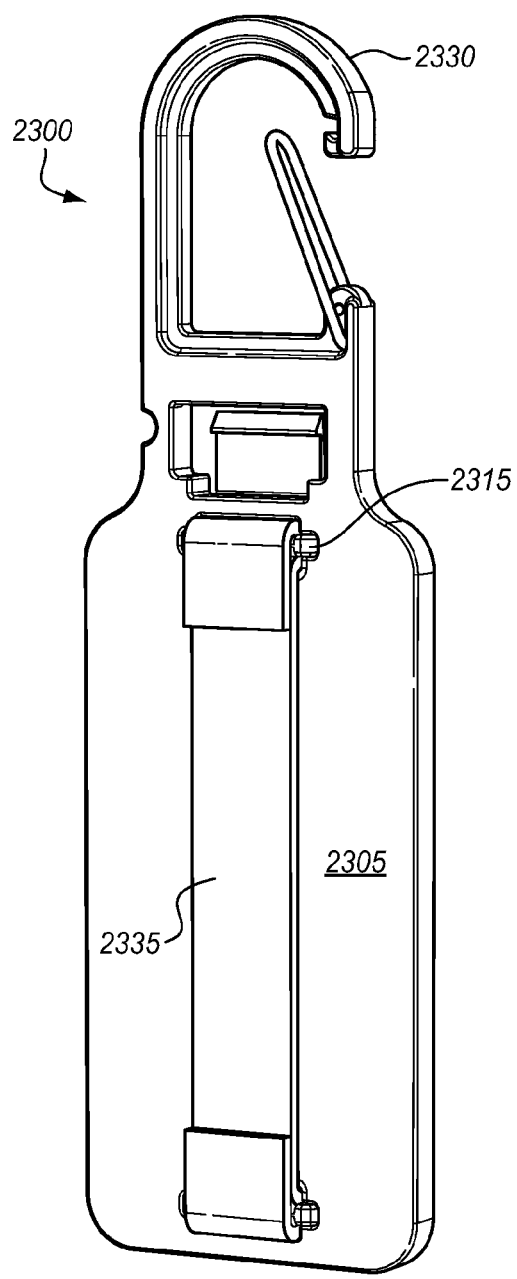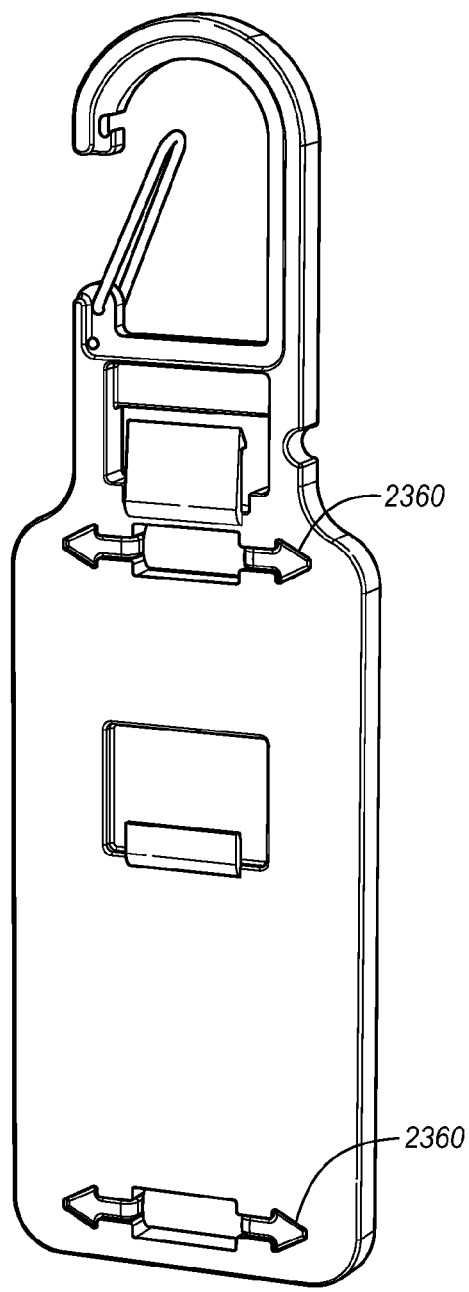
FIG. 23A
FIG. 23B

CANTILEVERED SNAP FIT CASE

CROSS-REFERENCE TO RELATED APPLICATIONS

This application is related to the US Patent Application entitled "TIE WRAP FOR BUNDLING OBJECTS" filed concurrently herewith, which is a continuation-in-part of U.S. patent application Ser. No. 12/247,523 filed Oct. 8, 2008. The foregoing applications are hereby incorporated by reference to the same extent as though fully disclosed herein.

BACKGROUND

Cases for mobile phones, tablet PCs, and other portable electronic devices are commonly used to provide protection for the device, attachment to various objects, and decoration. Such devices typically are expensive and somewhat prone to damage from being dropped or from other impact. Therefore, users commonly employ screen protectors and cases in order to protect their investment in their phone, tablet PC, or other portable electronic device.

Cases typically come in two varieties. In one variety, the case is a non-rigid material that must be stretched to fit over the electronic device. In another variety, the case is extremely rigid. In both cases, taking off the case may require significant effort in terms of stretching the case or snapping a rigid case on and off. A loose fitting non-rigid case may provide for some degree of ease of removal, but since it is the case that is non-rigid, the impact protection would be minimal.

SUMMARY

In one embodiment, a case for holding an electronic device includes a semi-rigid body having a rear face, a top sidewall, a bottom sidewall, a left sidewall, and a right sidewall, with the top, bottom, left, and right sidewalls forming an approximately rectangular shape. The rear face is approximately perpendicular to the top, bottom, left, and right sidewalls and spans between the top, bottom, left, and right sidewalls. The left and right sidewalls have a first and second flexible body portion break. The first flexible body portion break begins at a first edge of the right sidewall. The first edge is distal from the rear face. The first flexible body portion break extends into the rear face through the right sidewall. The second flexible body portion break begins at a second edge of the left sidewall. The second edge is distal from the rear face. The second flexible body portion break extends into the rear face through the left sidewall. The first and second flexible body portion break form a flexible body portion of the semi-rigid body, including the top sidewall. The flexible body portion may also be referred to as a cantilevered body portion. The flexible body portion has an attachment point that connects the flexible body portion, configured to allow the flexible body portion piece to flex away from the rear face causing the top sidewall to un-align from the approximately rectangular shape. The flexible body portion bends along its length from the attachment point to its end. In an alternative, a living hinge may be used at the attachment point and the living hinge will bend instead of the entirety of the flexible body portion. A living hinge is a highly flexible portion of the body. In one alternative, the semi-rigid body includes top, bottom, left, and right tabs extending perpendicular from the top, bottom, left, and right sidewalls, respectively, distal from the rear face, the left and right tabs forming a guide configured to guide a first and second edge of the electronic device inserted into the case when the flexible body portion is flexed away from the rear face, the bottom tab configured to receive a third edge of the electronic device, the top tab configured to snap-fit over a fourth edge of the electronic device when the electronic device is placed in the case and the flexible body portion is flexed back to align with the approximately rectangular shape. In another alternative, the semi-rigid body includes top, bottom, left, and right rear tabs extending perpendicular from the top, bottom, left, and right sidewalls, respectively, proximate to the rear face, the left and right tabs and the left and right rear tabs cooperating to form the guide. Optionally, the left and right tabs and the rear face cooperate to form the guide. Alternatively, the semi-rigid body includes a plurality of apertures configured to provide access to parts of the electronic device. Optionally, the semi-rigid body is a single piece of material. In one alternative, the semi-rigid body includes a first, second, and third aperture for receiving an attachment, the first, second, and third apertures located within the rear face; and the semi-rigid body includes a first and second attachment support member, the first attachment support member oriented between the first and second apertures and the second attachment support member oriented proximate to the third aperture. Optionally, the attachment includes a first and second attachment tab, the first attachment tab configured on the attachment to align with the first and second apertures such that a portion of the first attachment tab fits in the second aperture and is engaged by the first attachment support member, and the second attachment tab is configured on the attachment to align with the third aperture and engage the second attachment support member. In one option, the portion of the first attachment tab is wedge-shaped such that, when advanced in the first aperture towards the first attachment tab, the portion wedges under the first attachment tab until it reaches the second aperture. In one alternative, the first attachment support and first and second apertures are configured such that, when the portion of the first attachment tab is depressed, the first attachment tab is slidable and when the portion of the first attachment tab is protruding in the second aperture, the first attachment tab is not slidable. Optionally, the attachment includes a clip. Optionally, the attachment includes a carabineer. Optionally, the attachment includes an arm band.

In another embodiment, a case for holding an electronic device includes a body having a void for holding the electronic device. The void approximately replicates the shape of the electronic device such that a face of the electronic device is not substantially surrounded by the body. The body has tabs configured to contact a portion of the face of the electronic device and hold the electronic device in the void such that it is held in place. The body has a flexible body portion, the flexible body portion defined by a cut in the body, dividing the body into a hinge portion and a main body. The hinge portion is configured to be flexed away from the main body to provide a direction that the electronic device is slidably removed. Optionally, a first portion of the tabs are a part of the hinge portion of the body and are configured to snap fit over the electronic device in order to secure the electronic device when the hinge portion is not flexed away from the main body. Alternatively, a second portion of the tabs are part of the main body and form a guide for slidably removing the device. Optionally, the second portion of the tabs cooperates with the main body to form the guide. Optionally, the body includes rear tabs wherein the second portion of the tabs cooperates with the rear tabs to form the guide. Optionally, the body is formed from a single piece of material.

In one embodiment, a case for holding an electronic device includes a body for holding the electronic device including a first, second, and third aperture for receiving an attachment.

The first, second, and third apertures are located within the rear face. The body includes a first and second attachment support member. The first attachment support member is oriented between the first and second apertures, and the second attachment support member is oriented proximate to the third aperture. The attachment includes a first and second attachment tab. The first attachment tab is configured on the attachment to align with the first and second apertures such that a portion of the first attachment tab fits in the second aperture and is engaged by the first attachment support member. The second attachment tab is configured on the attachment to align with the third aperture and engage the second attachment support member. The portion of the first attachment tab is wedge-shaped such that, when advanced in the first aperture towards the first attachment tab, the portion wedges under the first attachment tab until it reaches the second aperture. Optionally, the first attachment support and first and second apertures are configured such that, when the portion of the first attachment tab is depressed, the first attachment tab is slidable, and when the portion of the first attachment tab is protruding in the second aperture, the first attachment tab is not slidable.

BRIEF DESCRIPTION OF THE FIGURES

FIGS. 23a and 23b show an embodiment of an attachment including a carabineer and elastic strap;

DETAILED DESCRIPTION

Figure 1:
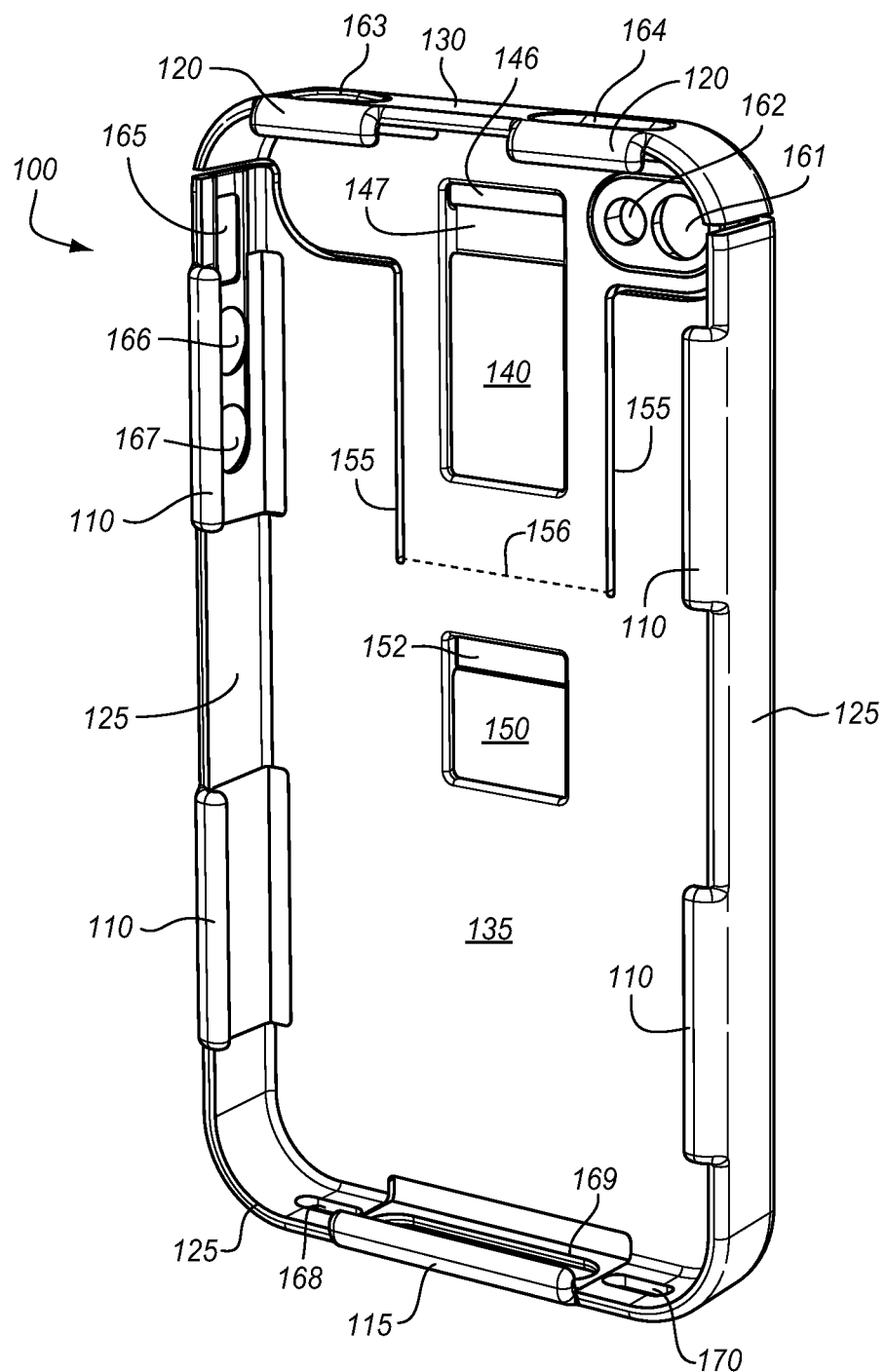
FIG. 1 shows a perspective view of one embodiment of a case with a flexible body portion.

Certain terminology is used herein for convenience only and is not to be taken as a limitation on the embodiments of a case with a flexible body portion. In the drawings, the same reference letters are employed for designating the same elements throughout the several figures.

The words "right", "left", "front", and "back" designate directions in the drawings to which reference is made. The words "inwardly" and "outwardly" refer to directions toward and away from, respectively, the geometric center of the case with flexible body portion and designated parts thereof. The terminology includes the words above specifically mentioned, derivatives thereof, and words of similar import. The proportions of the drawings are reflective of the electronic devices that they are designed to fit and the drawings generally reflect scaled up or scaled down proportional representations of these cases.

Like reference numerals designate like or corresponding parts throughout the various views and with particular reference to each of FIGS. 1-10 as delineated below.

Embodiments of a case with flexible body portion include a case that provides for easy insertion of an electronic device while providing for durability and the attachment of multiple connectors. The case with flexible body portion can be used for a variety of electronic devices including, but not limited to, touch screen phones, tablet PCs, MP3 players, music players and PDAs. The design of the case provides for easy access to the touch screen while protecting and providing shock absorption to the rest of the phone. A semi-rigid plastic is used that is rigid enough to dissipate impacts but provides for some flexibility of the flexible body portion.

Figure 2:
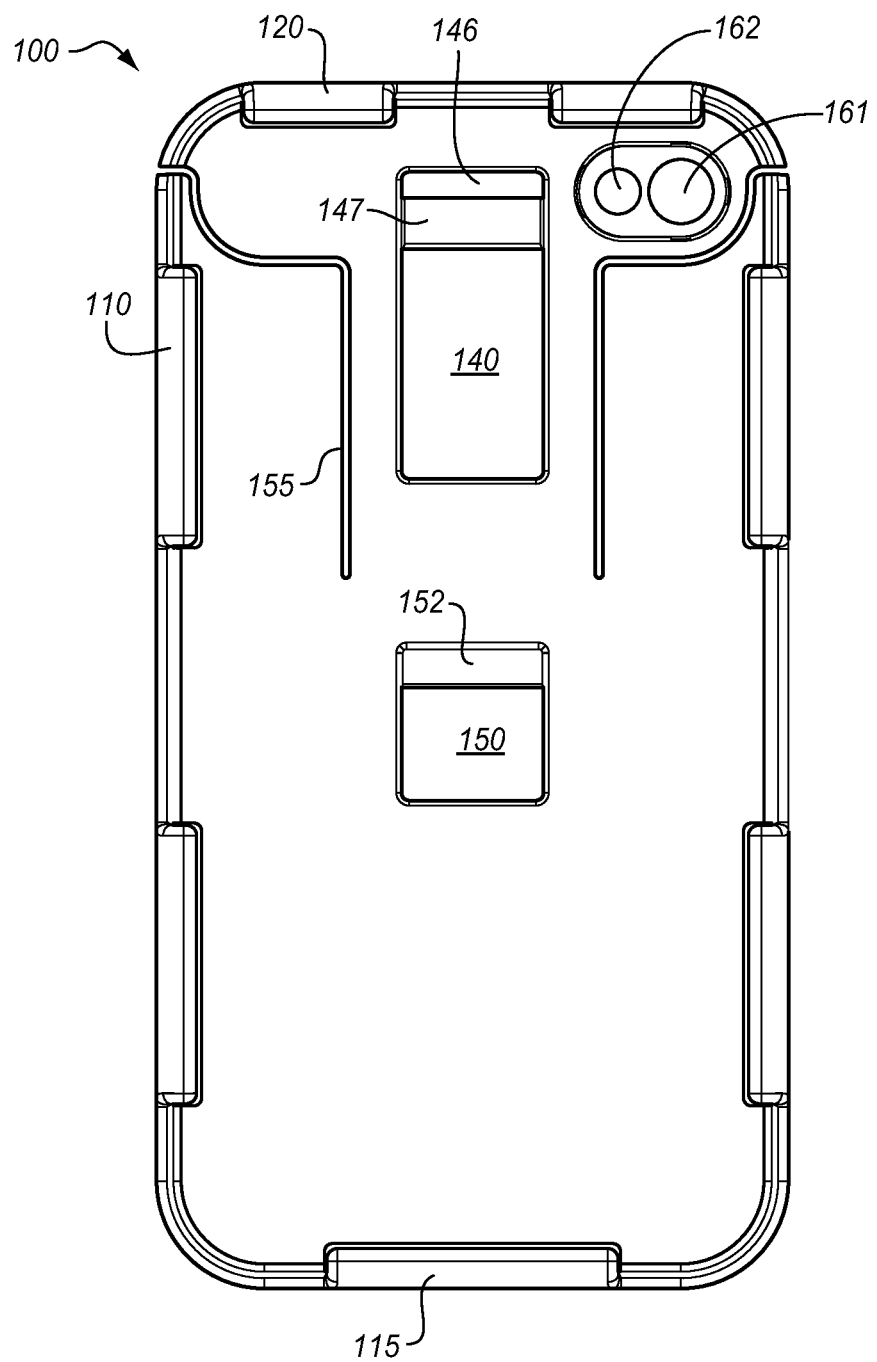
FIG. 2 shows a front view of the case of FIG. 1.
Figure 3:
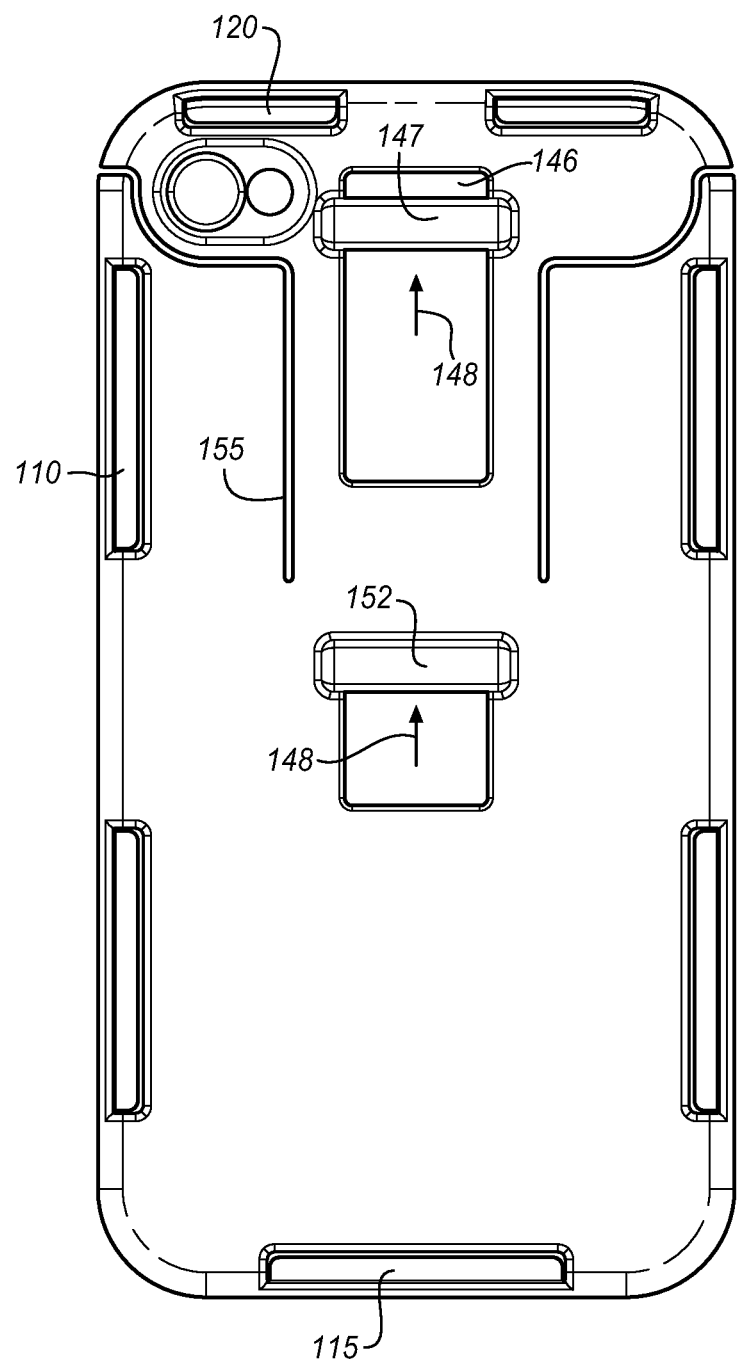
FIG. 3 shows a rear view of the case of FIG. 1.

FIGS. 1-3 show one embodiment of a case with a flexible body portion 100 from different views. Case 100 includes side holding tabs 110, bottom holding tabs 115, and top holding tabs 120. These holding tabs extend from side wall 125 making up the bottom, left, and right sidewalls, and hinge sidewall 130 making up the top sidewall. Case 100 includes back wall 135 which includes clip attachment cutouts 140,

150, 146. Although these areas are shown as cutouts, in alternatives, the body of the case could be solid while still including clip attachment supports 147 and 152. The case 100 further includes clip attachment supports 147 and 152. Case 100 includes numerous ports in the edge of the case providing access to buttons, inlets for power cords, and other access. Ports 161 and 162 provide for access to the camera lens and flash. The area surrounding Ports 161, 162 may be colored in order to minimize light emanating from the flash of the electronic device from being colored during operation. The coloring may be black and opaque or may be a variety of different colors depending on desired operation and the black and opaque configuration will provide for minimum interference from the coloring of the case. Port 163 provides access to a head phone jack. Port 164 provides for access to the on/off switch. Port 165 provides access to the lock button. Ports 166, 167 provide access to the volume controls of the device. Ports 168, 170 provide access to the speakers of the device for speaker phone operation. Port 169 provides access to the charging and dataport. The particular case 100 shown is for the iPhone 4®. Alternative embodiments of a case with a flexible body portion have different configurations of ports and different shape and sizing from case 100.

Figure 4:
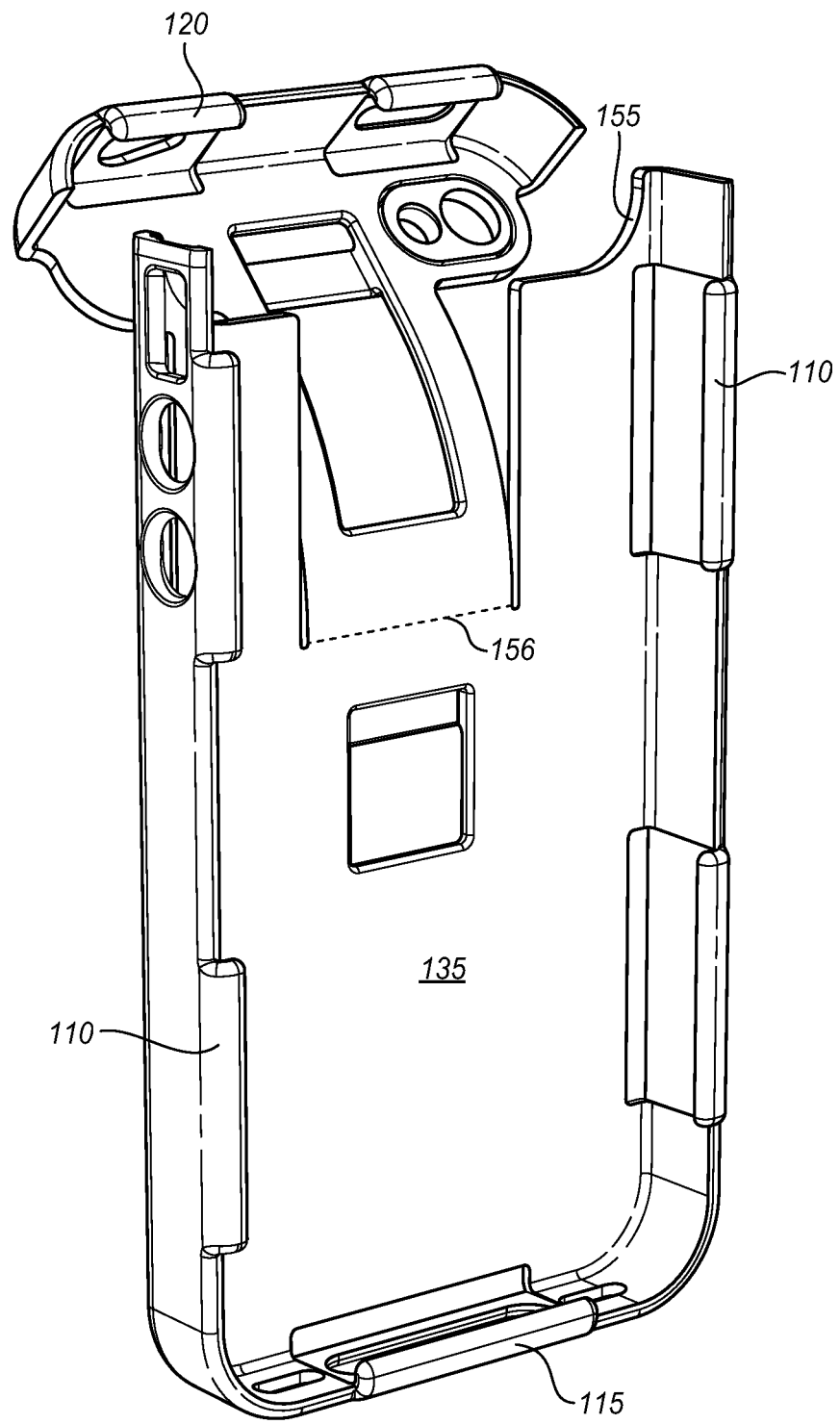
FIG. 4 shows a perspective view of the case of FIG. 1 with the flexible body portion flexed.

Cut 155 creates a flexible body portion in the back wall 135 of the case at attachment point 156. The flexible body portion may also be referred to a cantilevered body portion. Cut 155 allows the case to flex. In operation, flexible body portion defined by attachment point 156, cut 155 and the upper edge of the case is flexed out of line with back wall 135. This allows for an electronic device (iPhone 4®) to be slid into the case between holding tabs 110, down to holding tabs 115. Flexible body portion then may be flexed back towards back wall 135. FIG. 4 shows the position of the flexible body portion in a back-flexed position. Holding tabs 120 snap over the edge of the electronic device, securing the electronic device into case 100. In this arrangement, when flexible body portion is flexed, holding tabs 110 function as rails to easily slide the electronic device into case 100. Two additional advantages result from this arrangement. In a case that stretches and flexes to fit over the electronic device, a high degree of flexibility in the case is required. This lessens the effectiveness of the case to protect the electronic device from impact. Case 100 has a significant degree of rigidity; therefore, an impact to the side of the case will transfer the force along the frame of case 100. If the case was less rigid, the force would not be easily transferred along the case. A rigid case without a flexible body portion would not provide for rapid insertion and removal of the electronic device without the usage of multiple pieces. Case 100 is a single piece of material. A rigid case that snaps on requires significant pressure and force in order to snap it on and off. Case 100, therefore, may be significantly rigid, only requiring enough flexibility to bend at flexible body portion along the length of the flexible body portion, from the attachment point 156 to the upper end of the case 100. In an alternative, a living hinge may be substituted in at attachment point 156 in which case the flexible body portion will bend much less during flexing and primarily the living hinge will bend.

Holding tabs 110, 115, 120, in addition to providing a rail for the insertion of the electronic device and holding the device in place, may provide additional thickness and, therefore, rigidity to case 100. Additionally, the portion of holding tabs 110, 115, 120 that sit on the front of the electronic device (the screen or touch screen portion) prevent the face of the electronic device from touching or impacting a flat surface upon which the electronic device is placed or dropped. Holding tabs 110, 115, 120 in FIGS. 1-4 have a front and back tab portion allowing for merely the tabs to guide the insertion of the electronic device as opposed to the front tab portion and the back wall 135.

Figure 5:
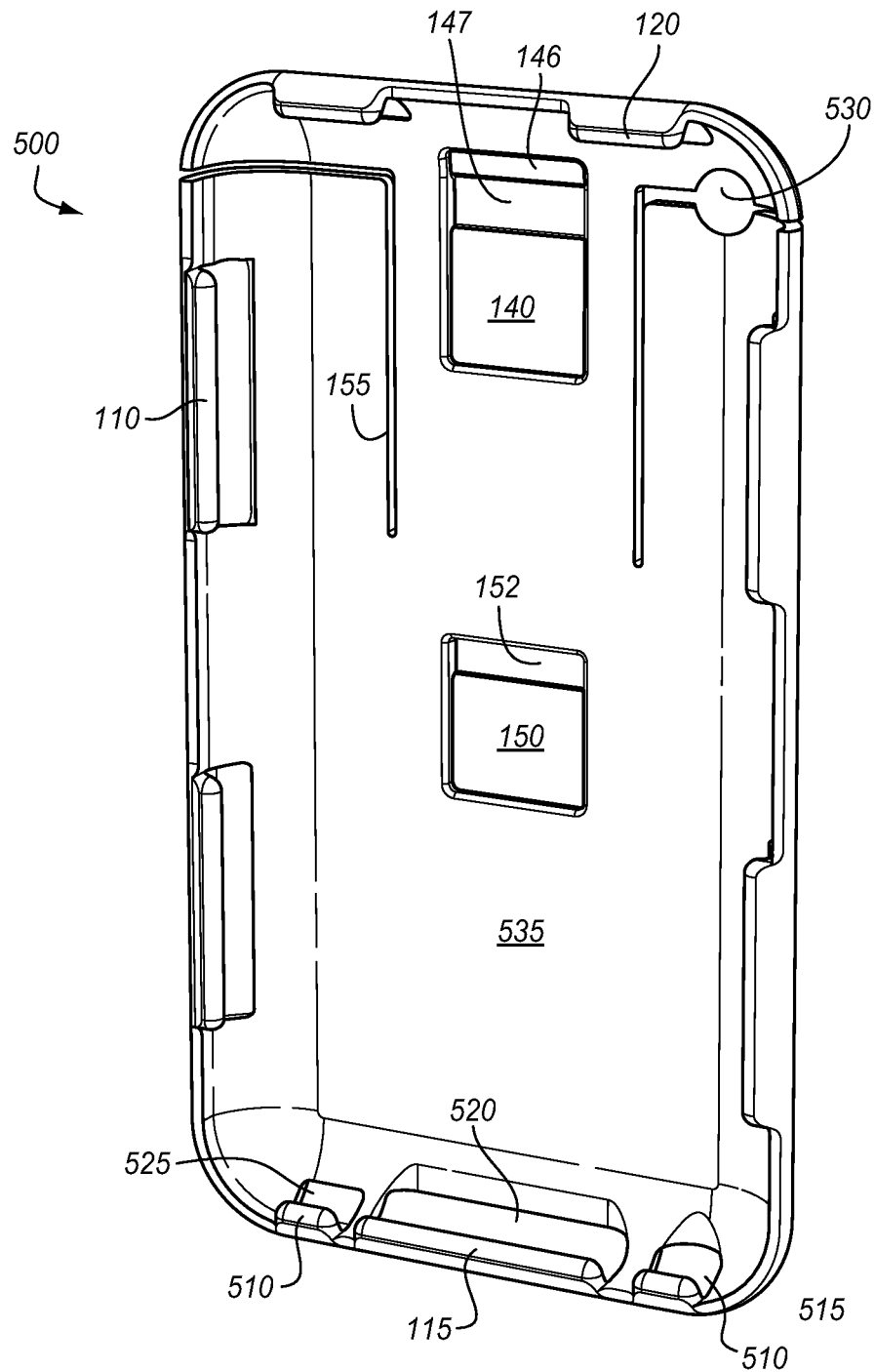
FIG. 5 shows a perspective view of an alternative embodiment of a case with a flexible body portion.
Figure 6:
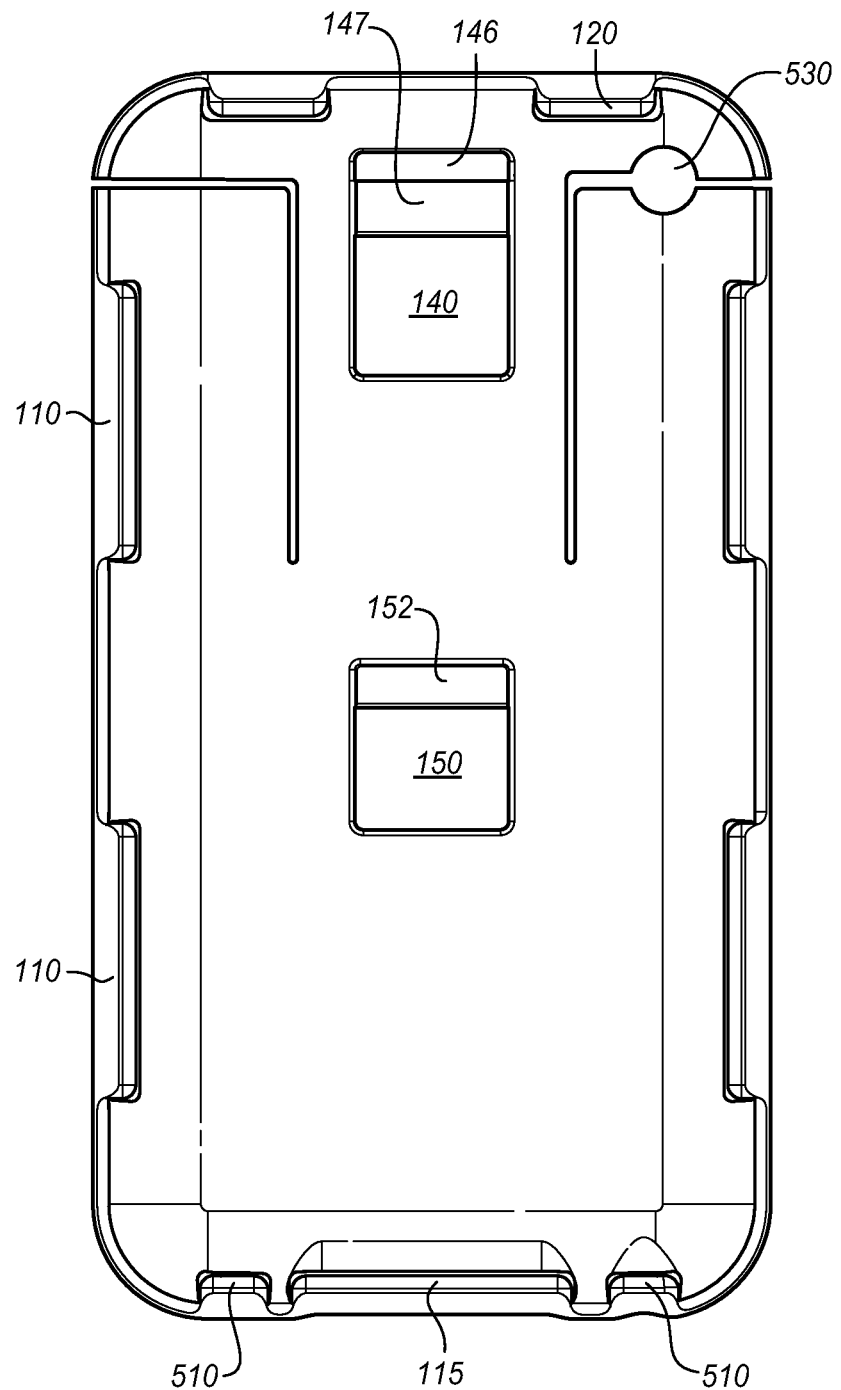
FIG. 6 shows a front view of the case of FIG. 5.

FIGS. 5 and 6 show an alternative embodiment of a case, case 500. In this embodiment, the case has many similar features to case 100. Note the differing shape of case 500 that corresponds to a differently shaped electronic device (in this case, an iPod Touch). The examples given are just two possibilities in a wide variety of possibilities. Most cases will have an essentially rectangular front face. In case 100, the front and rear faces are essentially rectangular, and the sides are essentially perpendicular. In case 500, the front face is essentially rectangular, but the sides are not perpendicular and, instead, are tapered or angled. Essentially, a case according to this disclosure may be made for any shape electronic device that can be slid in and out when the flexible body portion is flexed. In alternative embodiments, the case may be sized and shaped for a variety of electronic devices including touch screen phones, games, music players, PDAs and tablet computers (such as the iPad®). In the case of the iPad®, the holding tabs are easily sized and placed such that they do not interfere with the magnetic cover for the face of the iPad®. Due to the differences between the electronic devices for case 100 and case 500, holding tabs 110, 115, 120 are modified in case 500. Holding tabs 110, 115, 120 only provide a front tab portion and rely on back wall (rear face) 535 to provide the other side of the guide for the electronic device. Note that in case 500 and case 100, the holding tabs are oriented at ports or openings for the various buttons and connection points of the device. In FIG. 5, charging and dataport 520 coincides with holding tab 115. Openings 510, 515 which coincide with the speaker and transmitter of the electronic device, coincide with additional holding tabs 510. Opening 530 is for the camera lens of the electronic device and, in this case, no flash is utilized.

Both embodiments of the case shown include an attachment point for a holder (also known as "attachment"). In some embodiments, this holder is a clip as shown in FIGS. 7-10. In one alternative, the clip portion may be replaced with a connection for one or more Gear Ties, described in U.S. application Ser. No. 12/247,523, filed Oct. 8, 2008, and entitled "Tie Wrap For Bundling Objects," which is hereby incorporated by reference. In another alternative, an S-biner may be integrated into the holder described in U.S. application Ser. No. 11/770,470, filed Jun. 28, 2007, and entitled "Hook," which is hereby incorporated by reference. In another alternative, an arm band may be integrated into the attachment. In another alternative, a lariat may be integrated into the attachment. In other alternatives, combinations of the above and other connection systems may be integrated into the attachment.

Figure 9:
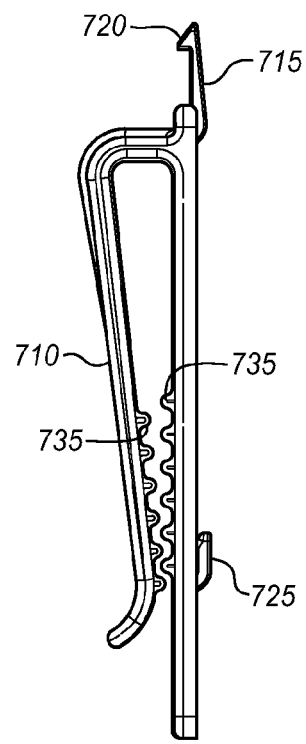
FIG. 9 shows a side view of the attachment of FIG. 7.
Figure 10:
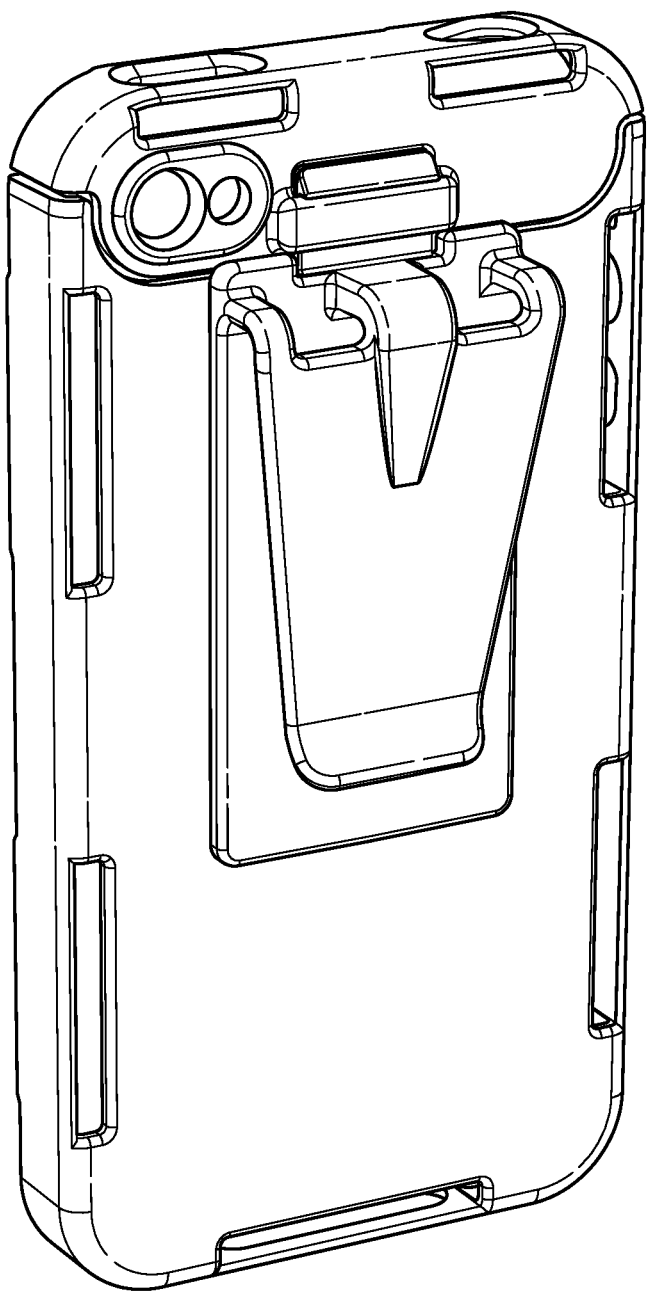
FIG. 10 shows a perspective view of the attachment of FIG. 7 interconnected with the case of FIG. 1.

FIGS. 7-10 show one embodiment of attachment 700 for case 100 or case 500. Attachment 700 includes a body 705 and a clip portion 710. Body 705 includes a first attachment tab 715 including a wedge 720 and a second attachment tab 725 oriented in depression 730. Attachment 700 further includes gripping protrusions 735. The clip portion 710 includes two apertures at the top for attaching a hook, clip, S-Biner®, or other hook like item. Referring to FIGS. 3 and 9, in order to connect the clip, wedge portion 720 and second attachment tab 725 are positioned on side 148 of attachment supports 147 and 152 and advanced such that they pass under attachment supports 147 and 152. In the case of second attachment tab 725, it merely sits under attachment support 152. The wedge portion of attachment support 715 passes under attachment support 147, and the wedge portion 720 protrudes on opening 146 on the other side. This locks attachment 700 in place. In order to release attachment 700, a user simply depresses wedge portion 720 and reverses attachment 700. FIG. 10 shows attachment 700 attached to case 100. In one alternative additional attachment supports may be used on the back of the case 100 (or other cases described herein). These supports (1 or more) may be located on either side of cut 155 and may accommodate additional tabs from an attachment. Located outside of cut 155 on the main body, these supports may reduce opening pressure on the flexible body portion.

Figure 11A:
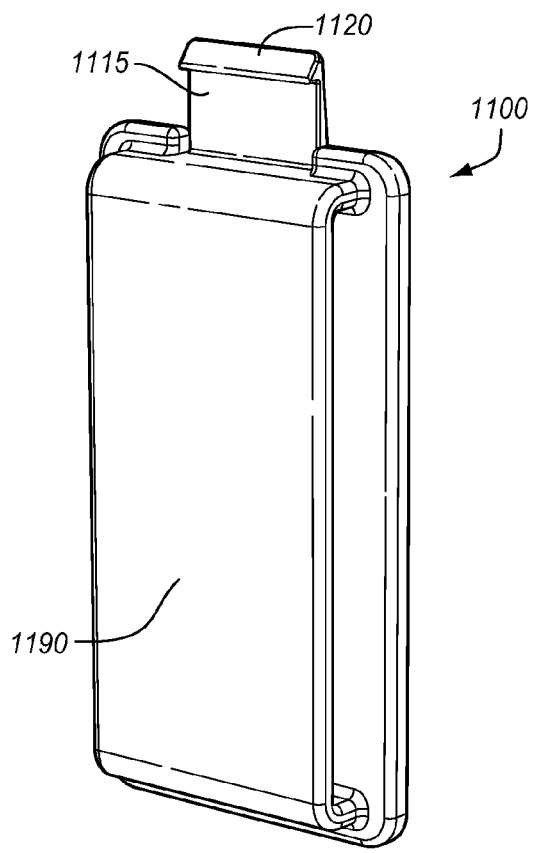
FIGS. 11a-11c show one embodiment of an attachment member with an integrated aperture for a strap.
Figure 11B:
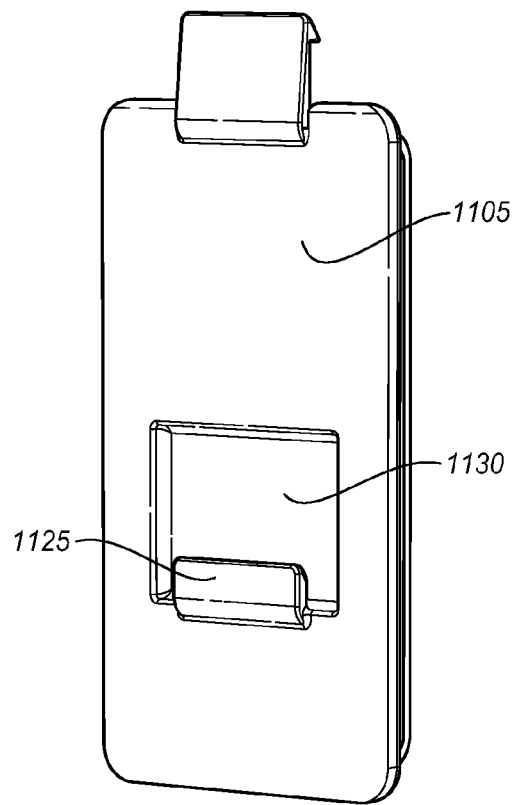
Figure 11C:
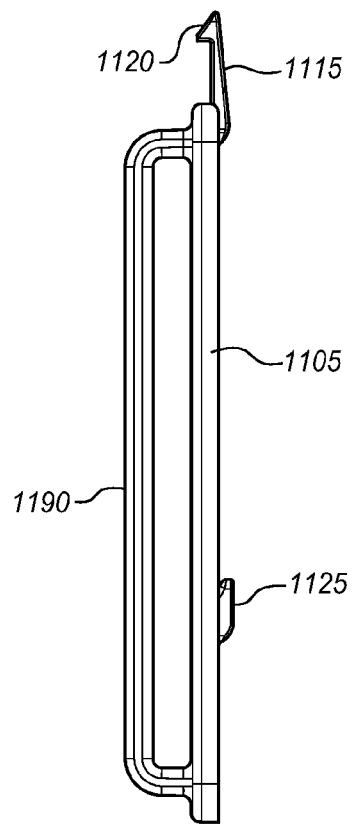
Figure 12:
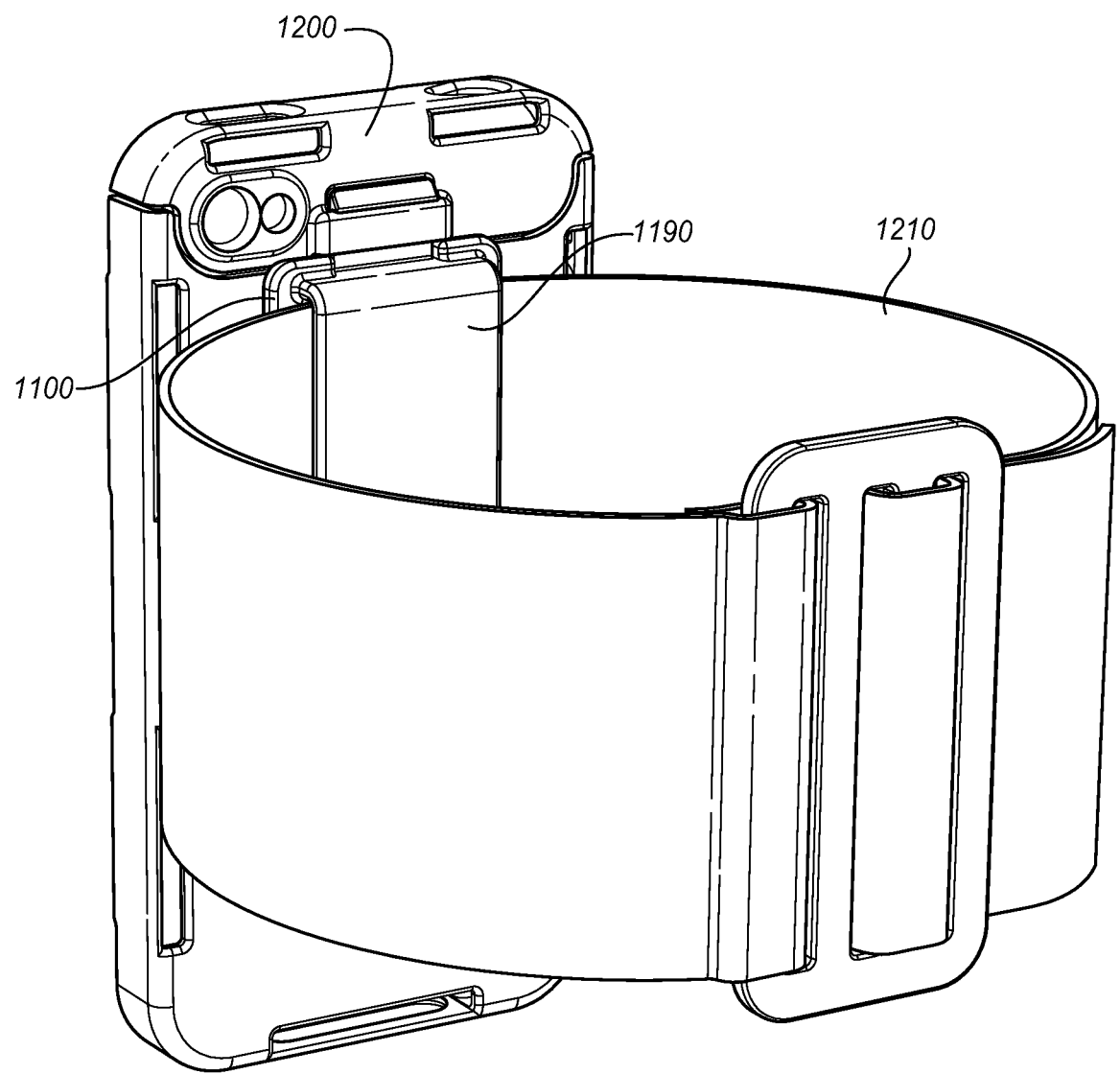
FIG. 12 shows the embodiment of FIG. 11a with the strap inserted.

FIGS. 11a-11c show another embodiment of an attachment 1100. This attachment includes a body 1105. Body 1105 includes a first attachment tab 1115 including a wedge 1120 and a second attachment tab 1125 oriented in depression 1130. This embodiment further includes a loop slot 1190. Loop slot 1190 can receive a loop, belt, arm strap, or other strap. FIG. 12 shows the attachment 1100 oriented on case 1200 with an arm strap 1210 in loop slot 1190.

Figure 13A:
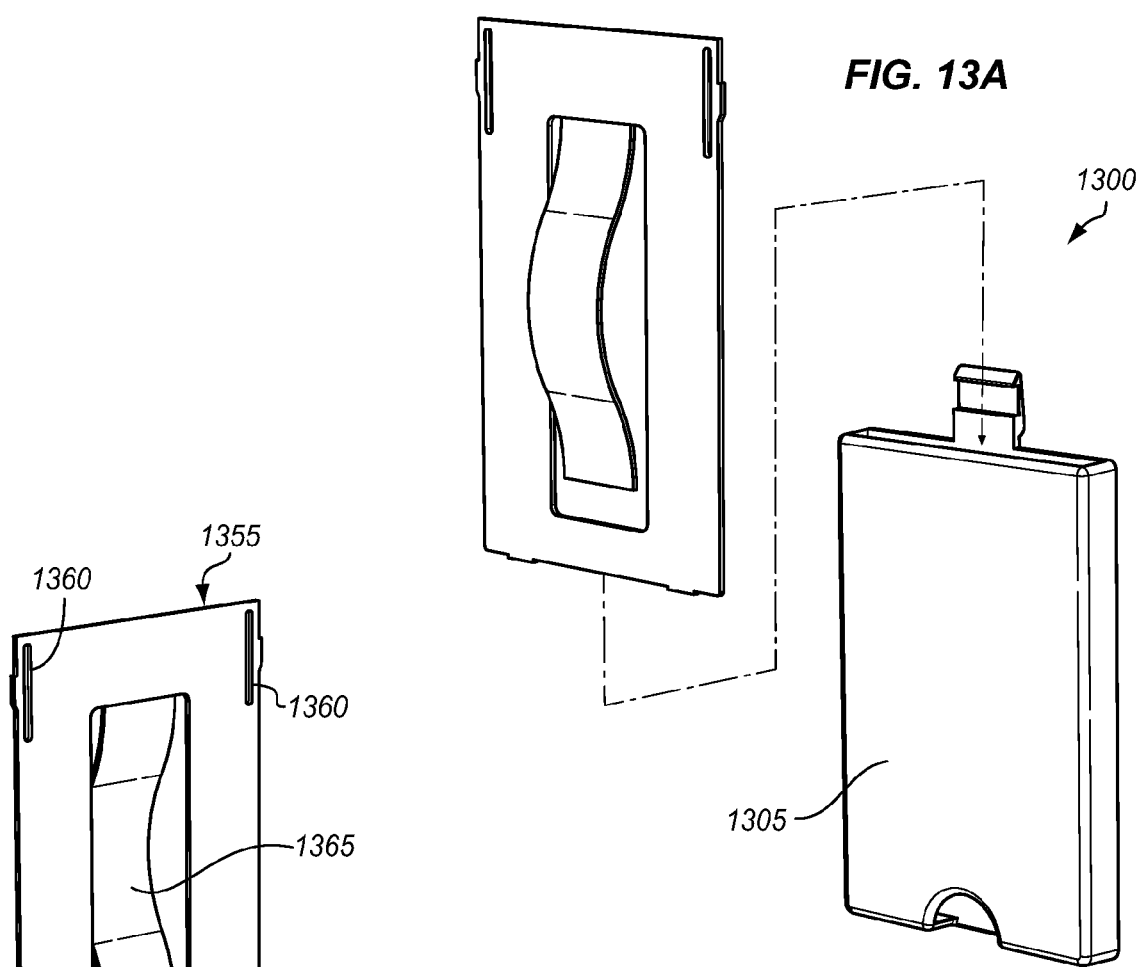
FIGS. 13a and 13b show exploded views of one embodiment of an attachment member for holding credit cards.
Figure 13B:
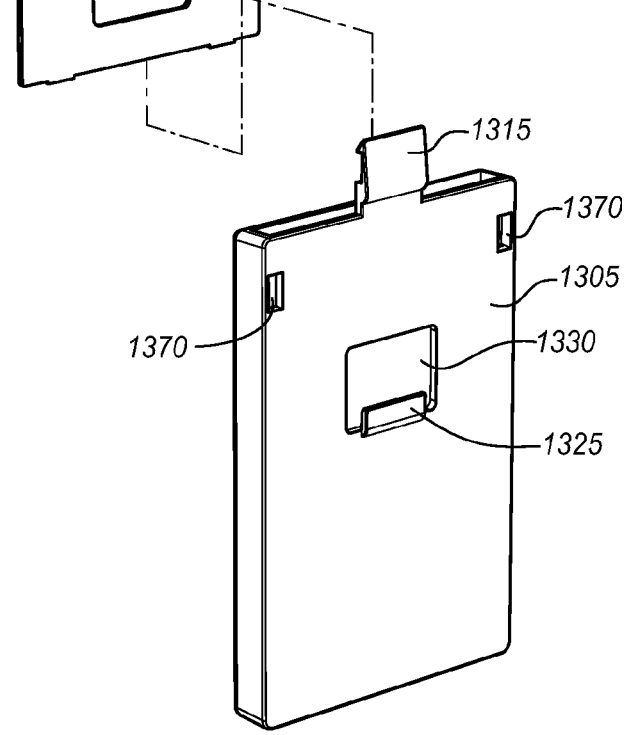
Figure 14:
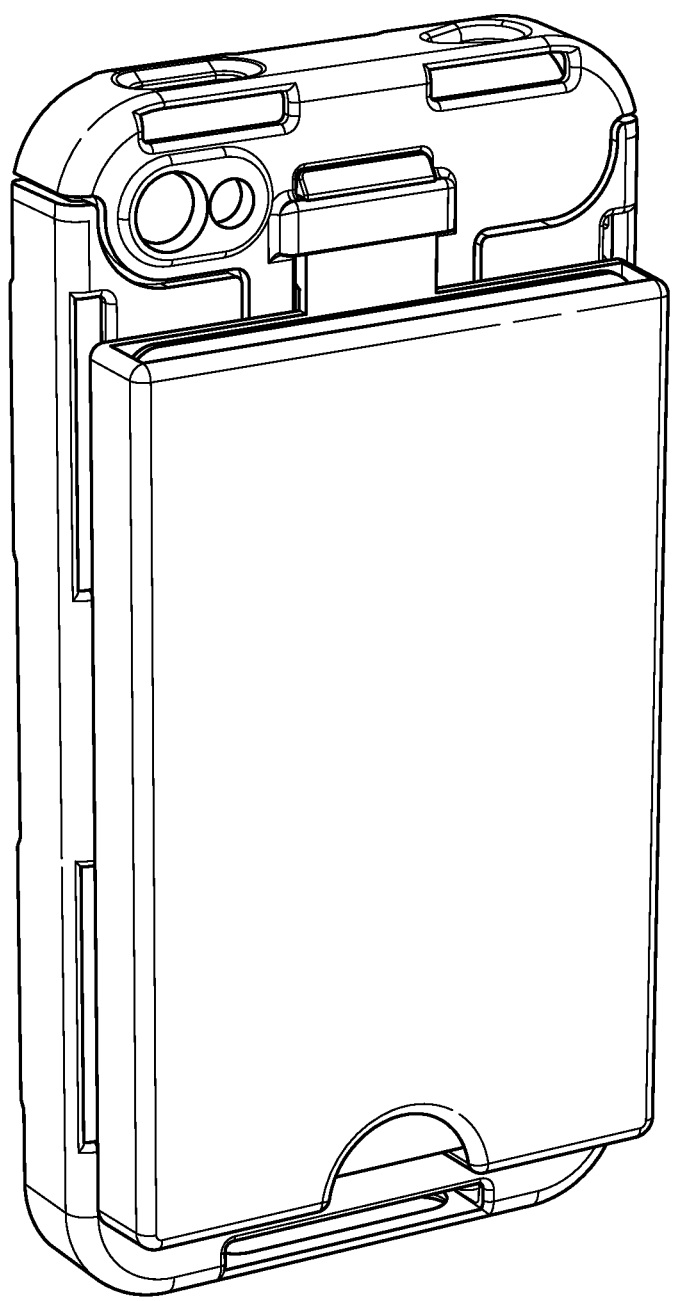
FIG. 14 shows the embodiment of FIG. 13a assembled.

FIGS. 13a and 13b show another embodiment of an attachment 1300. This attachment includes a body 1305. Body 1305 includes a first attachment tab 1315 including a wedge 1320 and a second attachment tab 1325 oriented in depression 1330. Body 1305 includes a rectangular slot 1350 oriented in the body. Rectangular slot 1350 is shaped and sized to hold credit cards or other cards. The attachment includes insert 1355. Insert 1355 has attachment tabs 1360 which have a cut out behind them to provide for flexibility. Tabs 1360 insert into holes 1370 to hold insert 1355 in rectangular slot 1350. When tabs 1360 are depressed, they will release insert 1355. Spring 1365 is designed to hold cards inserted into rectangular slot 1350. This configuration provides for a single mobile phone card carrying case combination. FIG. 14 shows the completed configuration.

Figure 15A:
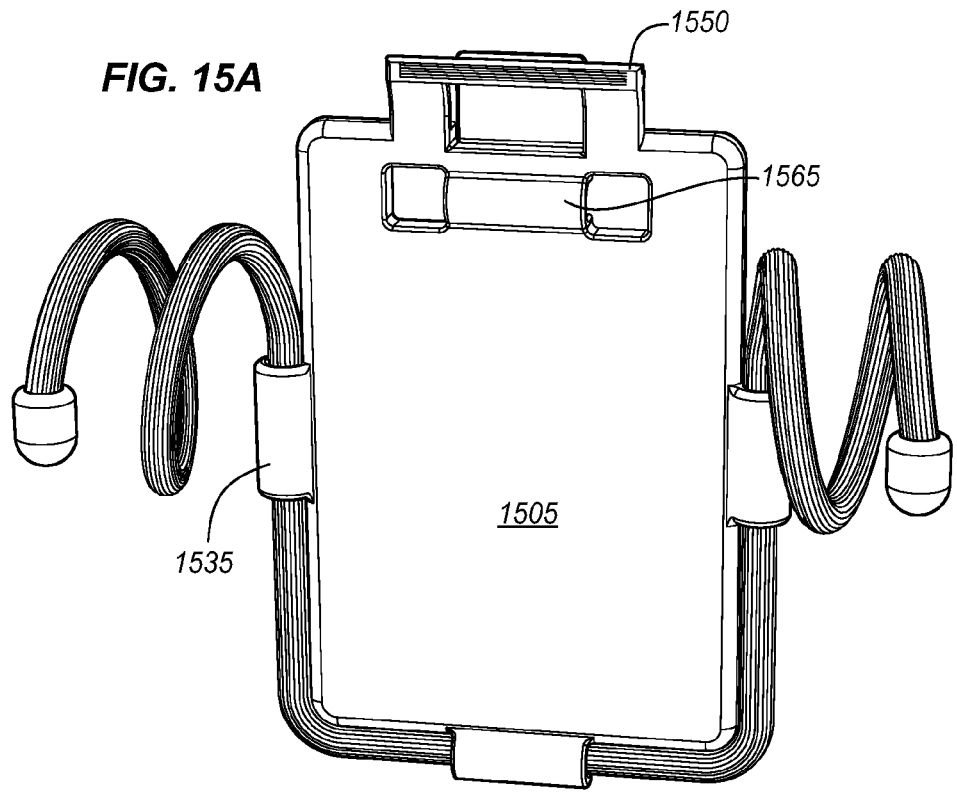
FIGS. 15a and 15b show an embodiment of an attachment with integrated gear tie and release tab.
Figure 15B:
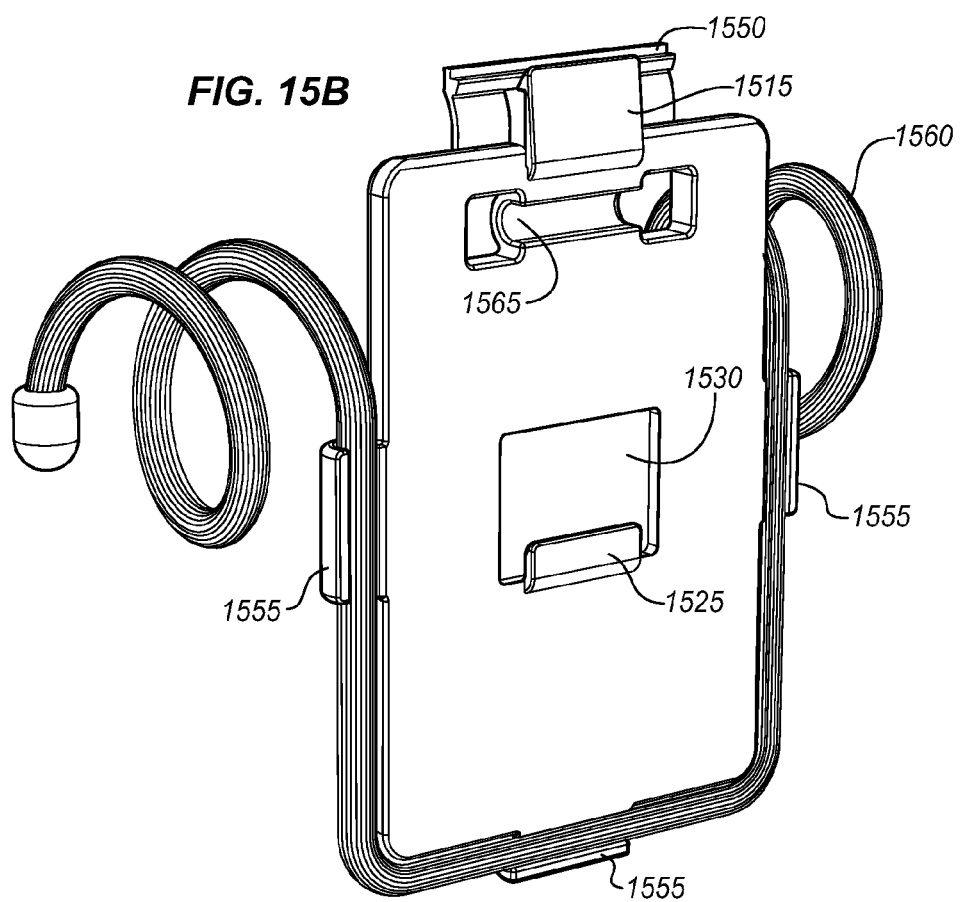

FIGS. 15a and 15b show another embodiment of an attachment, gear tie stand 1500. This attachment includes a body 1505. Body 1505 includes a first attachment tab 1515 including a wedge 1520 and a second attachment tab 1525 oriented in depression 1530. Body 1505 includes a release tab 1550. Release tab 1550 may be sized as shown or may be sized to be bigger or smaller depending on desired characteristics. Release tab 1550 is configured to press on first attachment tab 1515 to enable easy release of body 1505 from case 100 or case 500. Release tab 1550 is bendably interconnected (optionally as part of a one-piece construction) to body 1505. Body 1505 includes cylindrical holders 1555 and 1565. Cylindrical holders 1555 are adapted to receive a gear tie 1560 as shown. Optionally, other flexible ties that hold their shape may be used. Cylindrical holders 1555 include an aperture that is less than the width of gear tie 1560 such that the cylindrical holders 1555 flex and bend to receive gear tie 1560 and hold it firmly in place. Cylindrical holder 1565 is for folding and storing gear tie 1560. Gear tie 1560 is flexible and holds its position due to its wire core. The friction provided by gear tie 1560 allows it to be held in a variety of places, including the vents of a vehicle. By placing the ends of gear tie 1560 into the vent and bending them, the gear tie stand 1500, the body 1505, and attached case 100 or 500 may be easily mounted in a vehicle. The gear tie 1560 shown in FIGS. 15a and 15b is shown to have an extended length; however, in preferred embodiments, it may be shorter.

Figure 16:
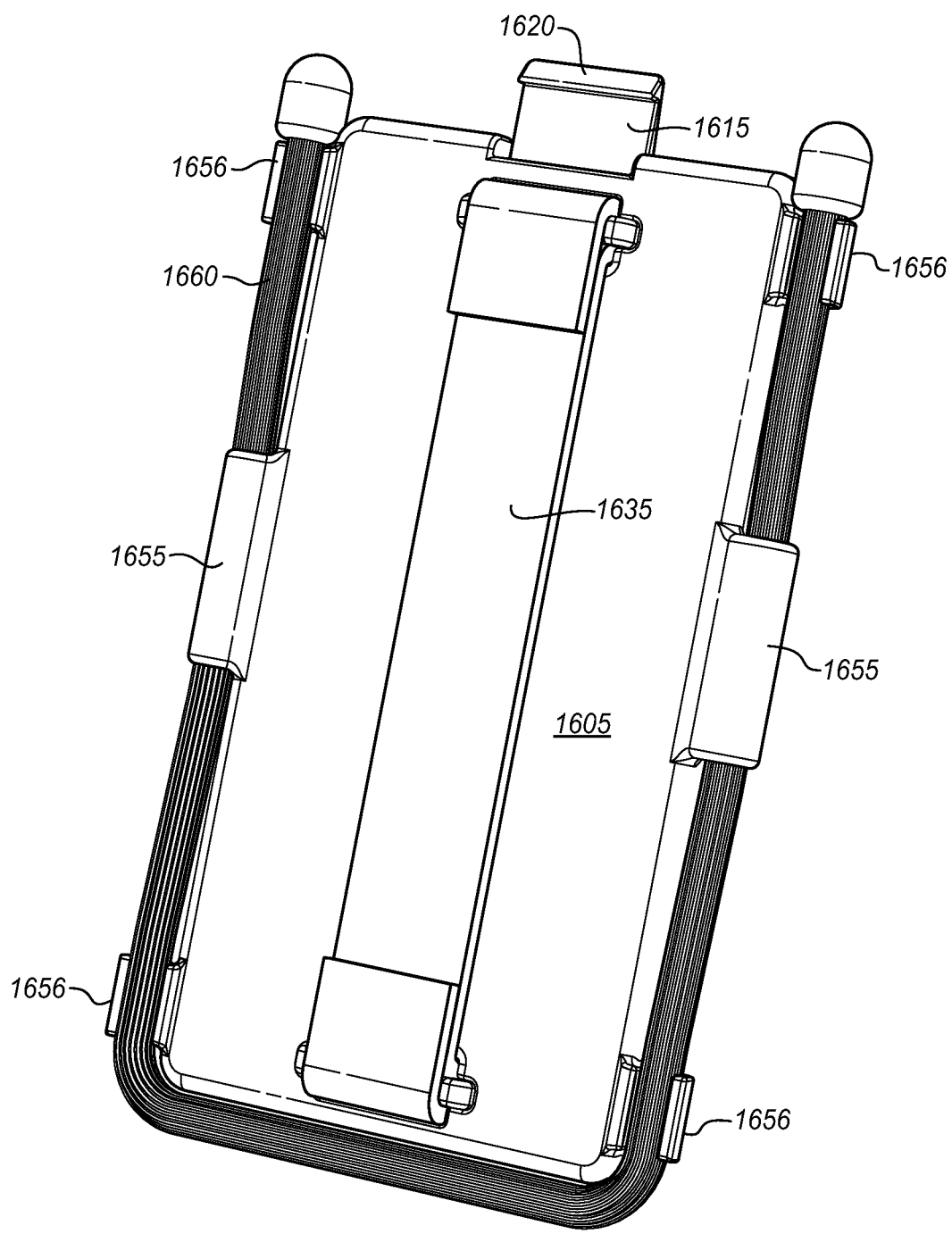
FIG. 16 shows another embodiment of an attachment with an elastic strap and integrated gear tie.
Figure 17:
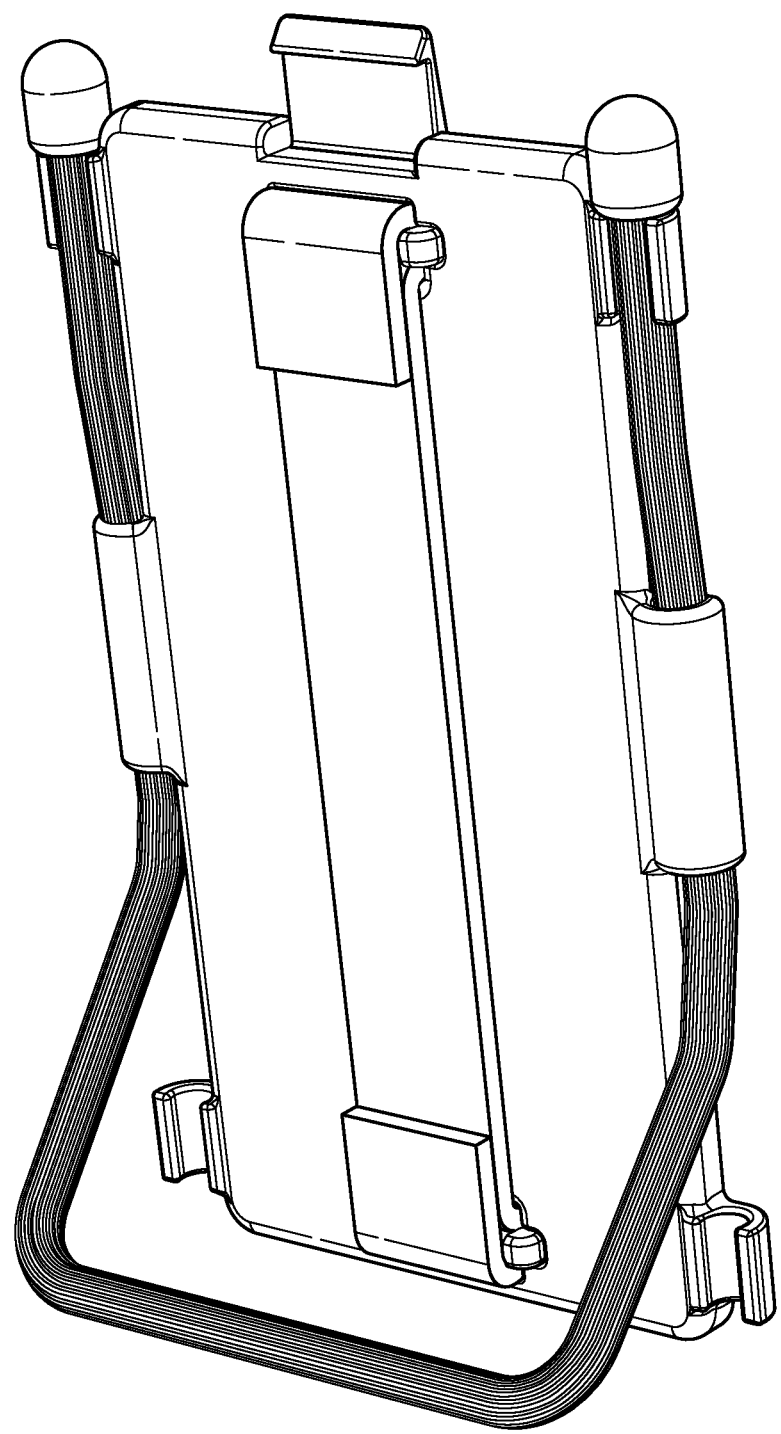
FIG. 17 shows the attachment of FIG. 16 arranged as a stand.
Figure 18:
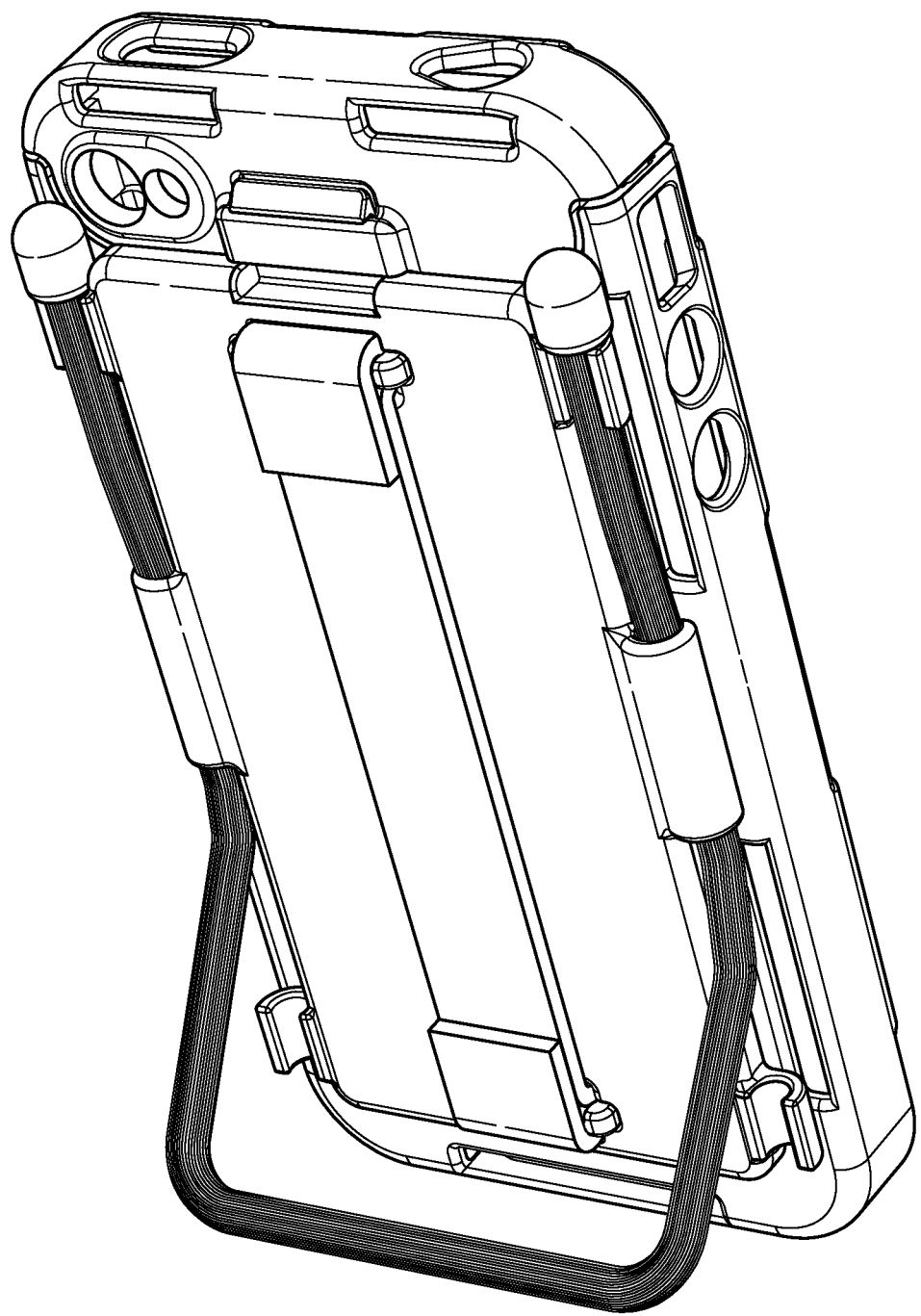
FIG. 18 shows the attachment of FIG. 16 arranged as a stand including the mobile phone case.
Figure 19:
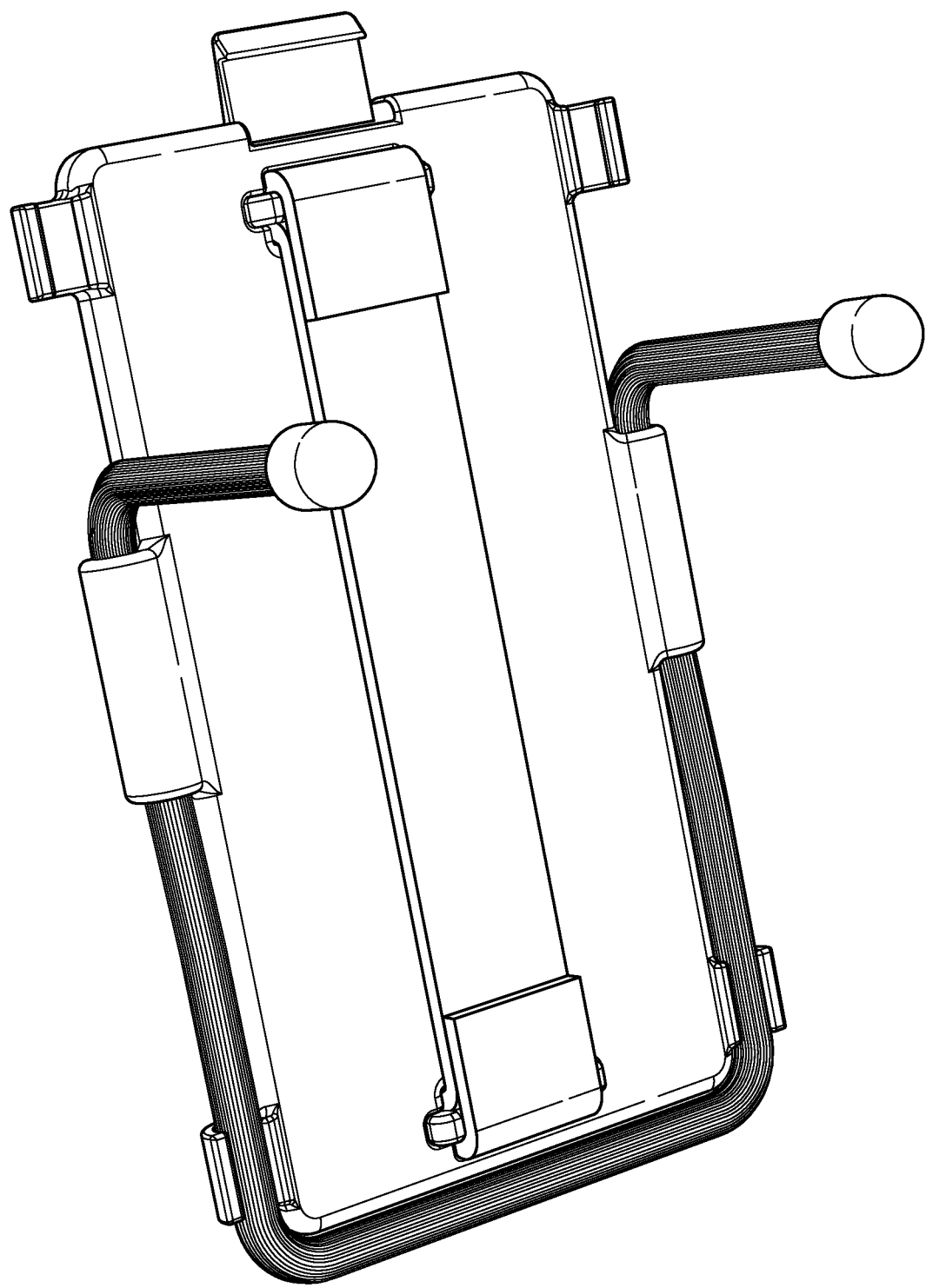
FIG. 19 shows the attachment of FIG. 16 arranged for insertion into the vent of a vehicle.

FIG. 16 shows another embodiment of a gear tie stand with strap 1600. This attachment includes a body 1605. Body 1605 includes a first attachment tab 1615 including a wedge 1650 and a second attachment tab (not shown). An elastic strap 1635 provides for the attachment of the gear tie stand 1600 to the hand of the user, when inserted between body 1605 and strap 1635. Cylindrical holders 1655, 1656 include an aperture that is less than the width of gear tie 1660 such that the cylindrical holders 1655 flex and bend to receive gear tie 1660 and hold it firmly in place. Cylindrical holders 1655, 1656 open in different directions in order to provide for easy of use and flexibility. As shown in FIGS. 17 and 18, by bending gear tie 1660 away from bottom cylindrical holders 1656, an upright stand is formed. As shown in FIG. 19, by bending the loose ends of gear tie 1660 away from bottom cylindrical holders 1656, another stand may be formed, as well as an extension for bending the gear tie 1660 into the vent of a vehicle as described above. FIG. 19 shows the flat version of a gear tie stand with strap 1600.

Figure 20:
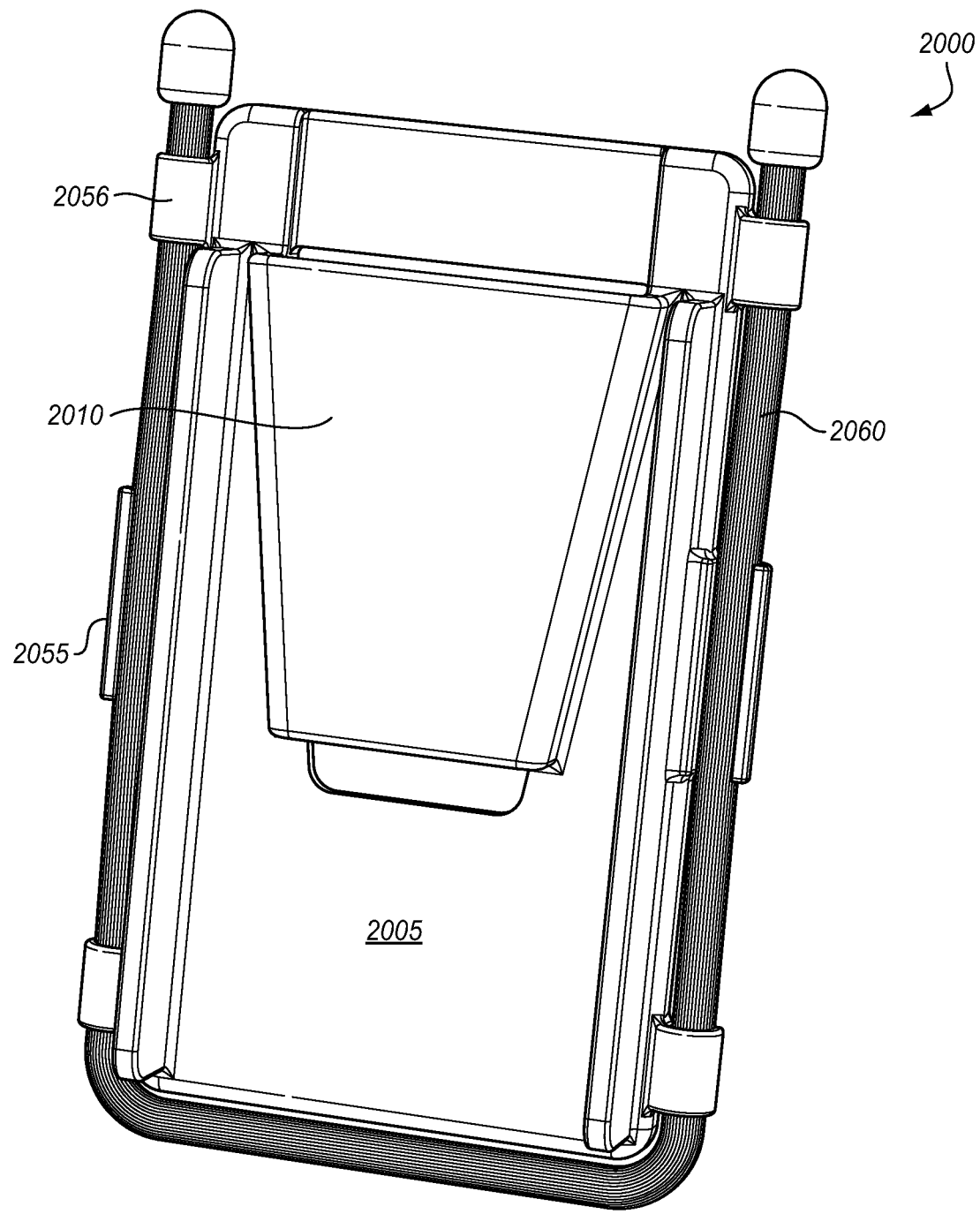
FIG. 20 shows an embodiment of a receiving attachment including gear ties.
Figure 21:
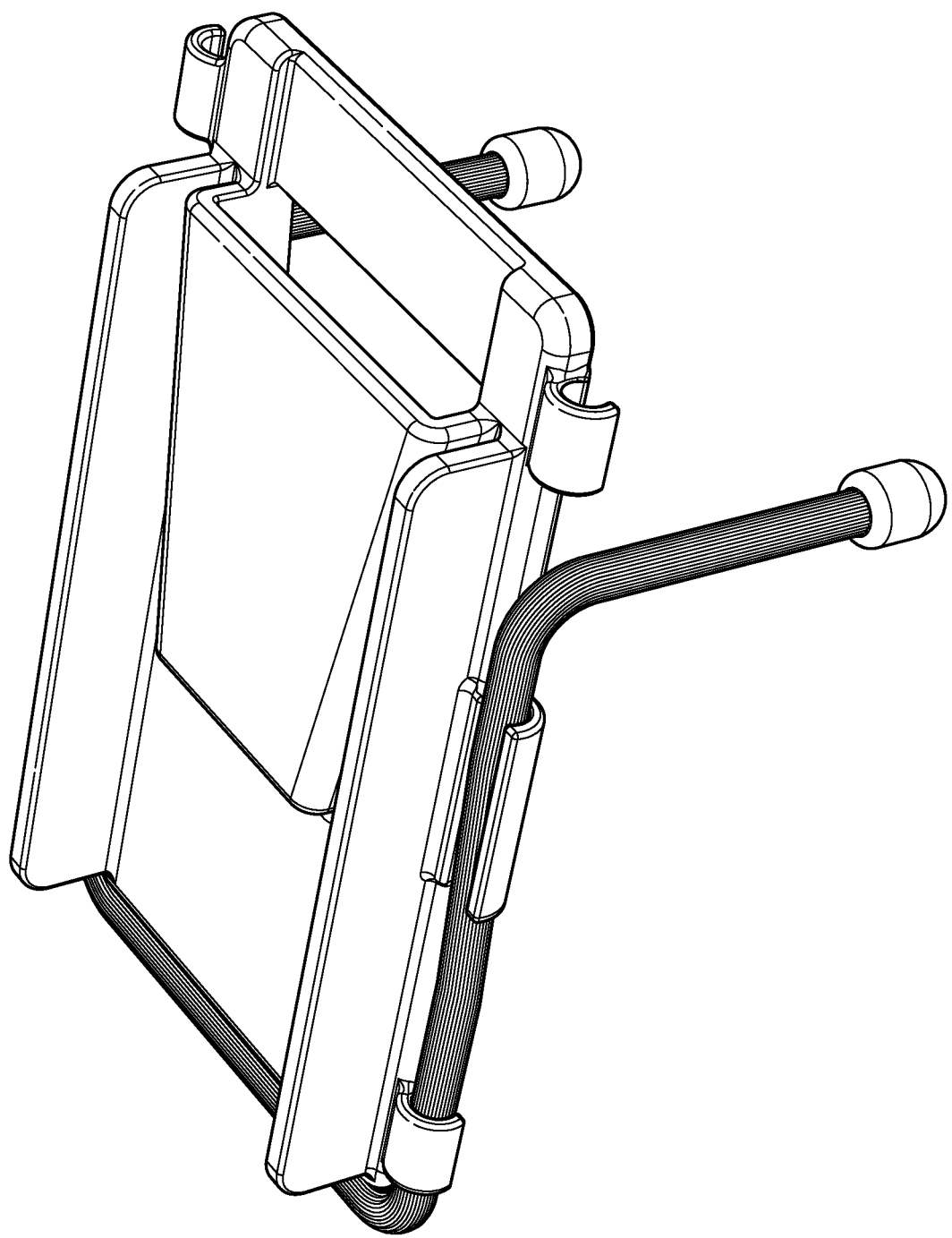
FIG. 21 shows the receiving attachment of FIG. 20 arranged for insertion into the vent of a vehicle.
Figure 22:
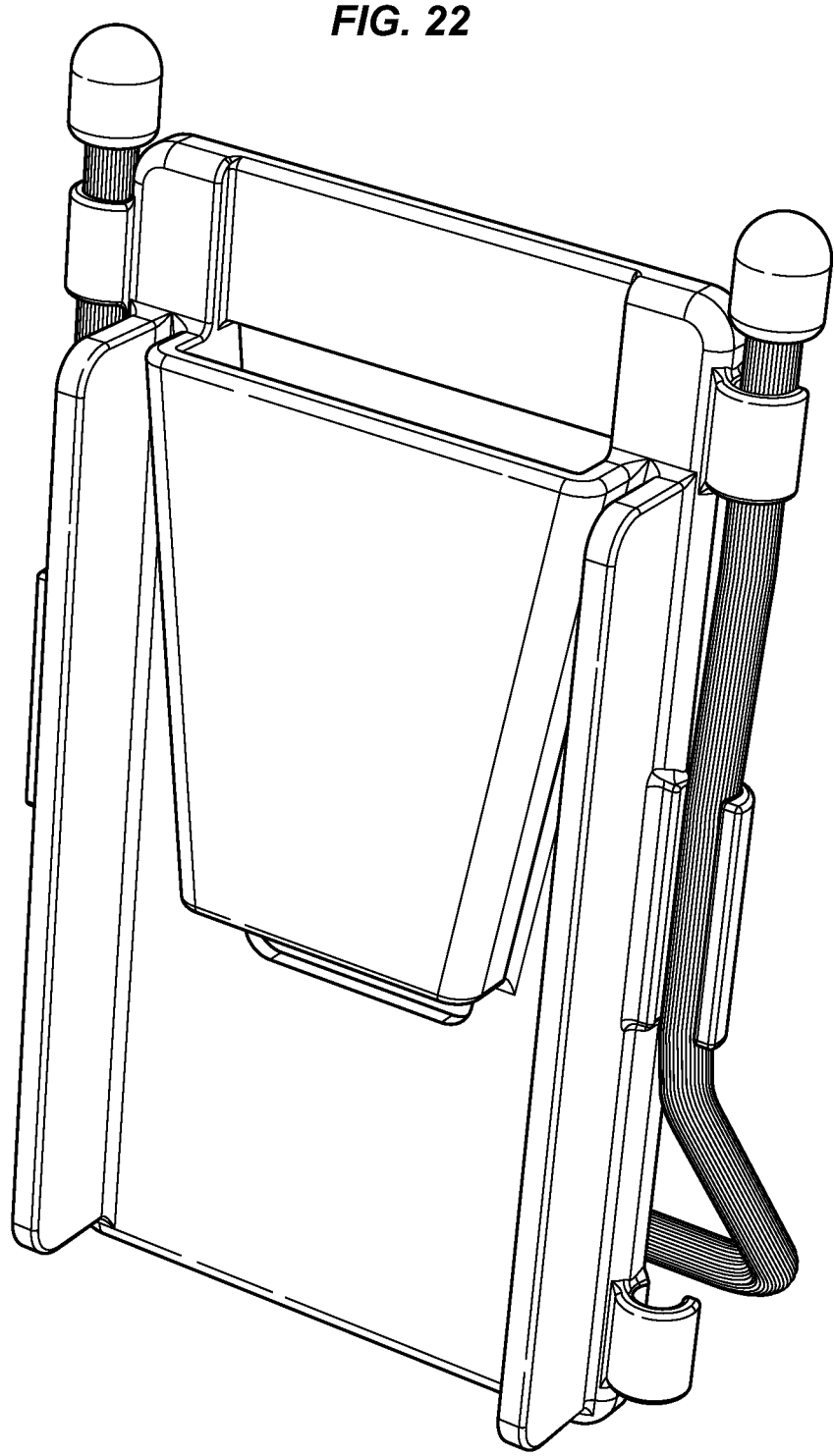
FIG. 22 shows the receiving attachment of FIG. 19 arranged as a stand.

FIG. 20 shows receiving attachment 2000 for integrating with attachment 700 or similar attachment. Clip portion 710 is sized to integrate into clip aperture 2010 oriented in body 2005. In some embodiments, clip portion 710 may include a tab at the bottom for locking clip portion 710 into clip aperture 2010. Cylindrical holders 2055, 2056 include an aperture that is less than the width of gear tie 2060 such that the cylindrical holders 2055 flex and bend to receive gear tie 2060 and hold it firmly in place. Cylindrical holders 2055, 2056 open in different directions in order to provide for ease of use and flexibility. This configuration may be advantageous in that the receiving attachment 2000 may be mounted in a car vent or other area using the configuration shown in FIG. 21. As shown in FIG. 22, by bending gear tie 2060 away from bottom cylindrical holders 2056, an upright stand is formed. In the above embodiments including a gear tie, both ends of the gear tie may be bent around a bar (such as the handle bars of a bike or other object). The cylindrical holders may be oriented in a variety of positions and a variety of number of holders may be utilized.

FIGS. 23a and 23b show another embodiment of an attachment 2300 providing an integrated carabineer 2350. An elastic strap 2335 provides for the attachment of attachment 2300 to the hand of the user, when inserted between body 2305 and strap 2335. Body 2305 also includes strap slots 2360 and strap bar 2365. This strap bar and strap slot configuration provides for the removal of the elastic strap 2335. Generally, the tension provided by elastic strap 2335 will hold the strap bars 2365 in place.

Figure 24A:
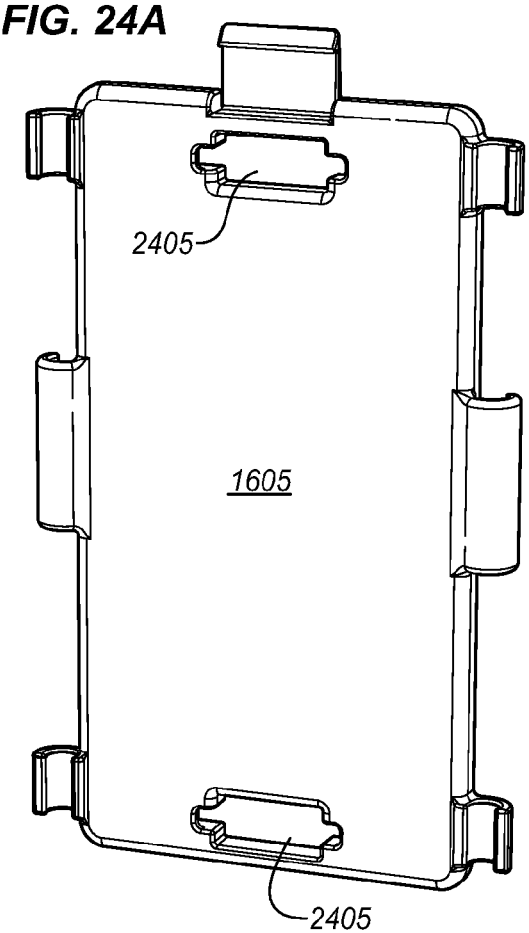
FIGS. 24a-24c show an exploded and stripped down view of the attachment of FIG. 16.
Figure 24B:
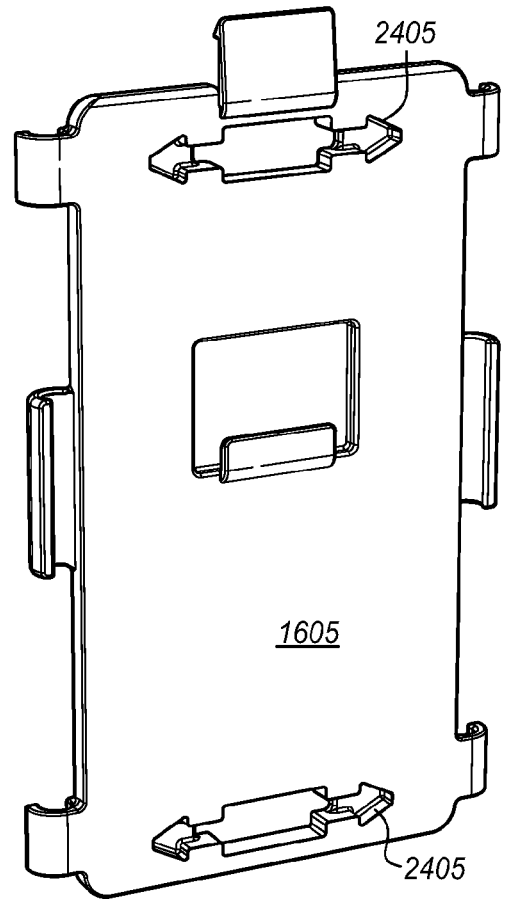
Figure 24C:
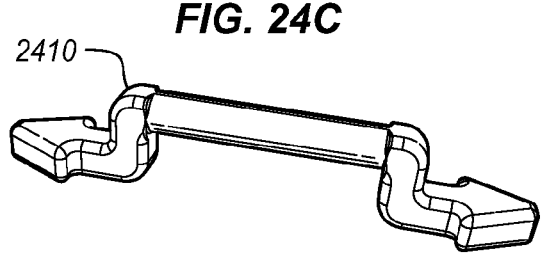

FIGS. 24a-24c show the gear tie stand with strap 1600 of FIG. 16. As is clearly shown, body 1605 includes a first and second aperture 2405 for receiving strap bar 2410. Strap bar 2410 flexes for insertion into first and second aperture 2405. In these figures, the gear tie 1660 has been removed. Due to the configuration, gear ties may be removed and replaced as desired.

Figure 25:
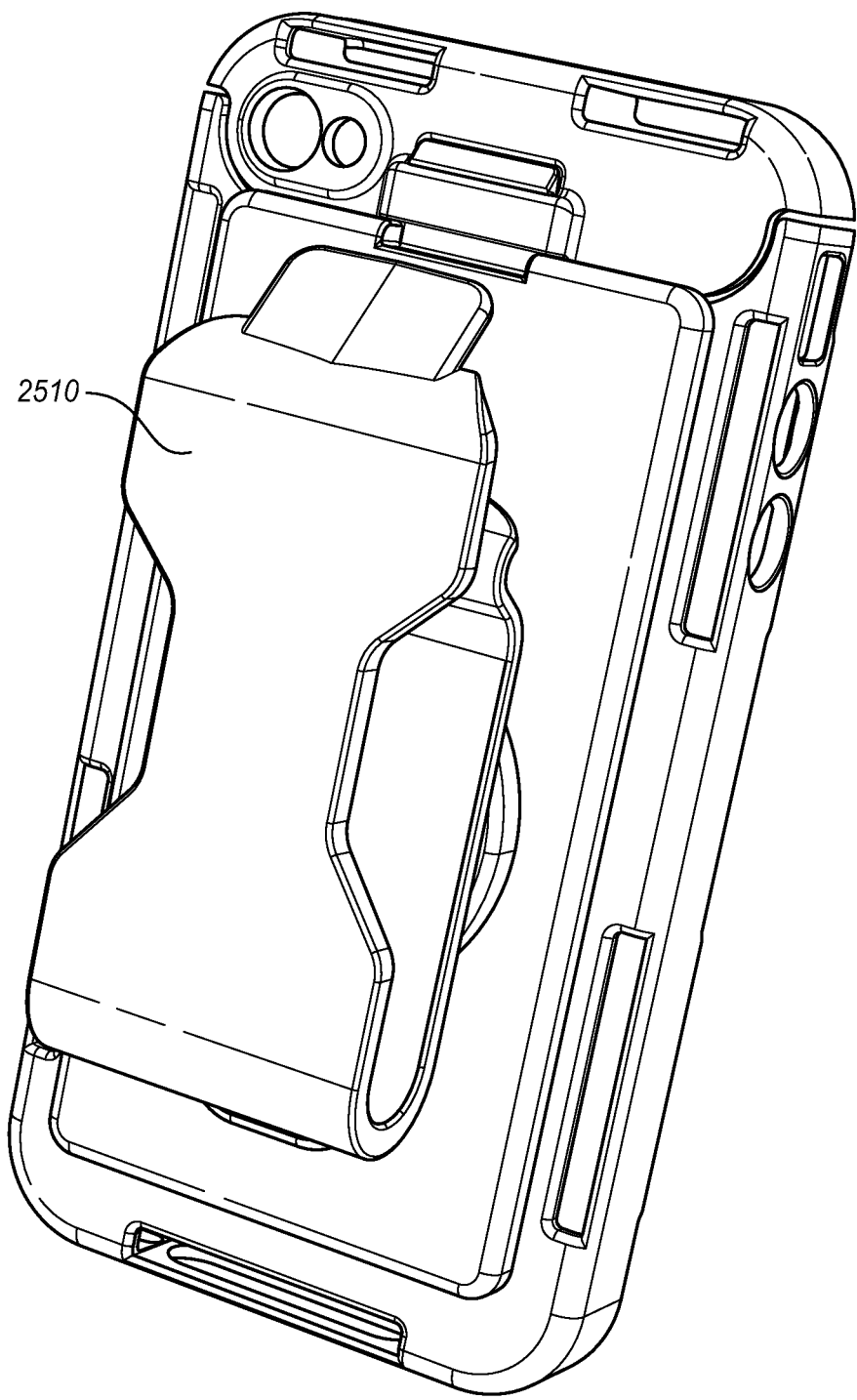
FIG. 25 shows an embodiment of an attachment including a modified clip.
Figure 26:
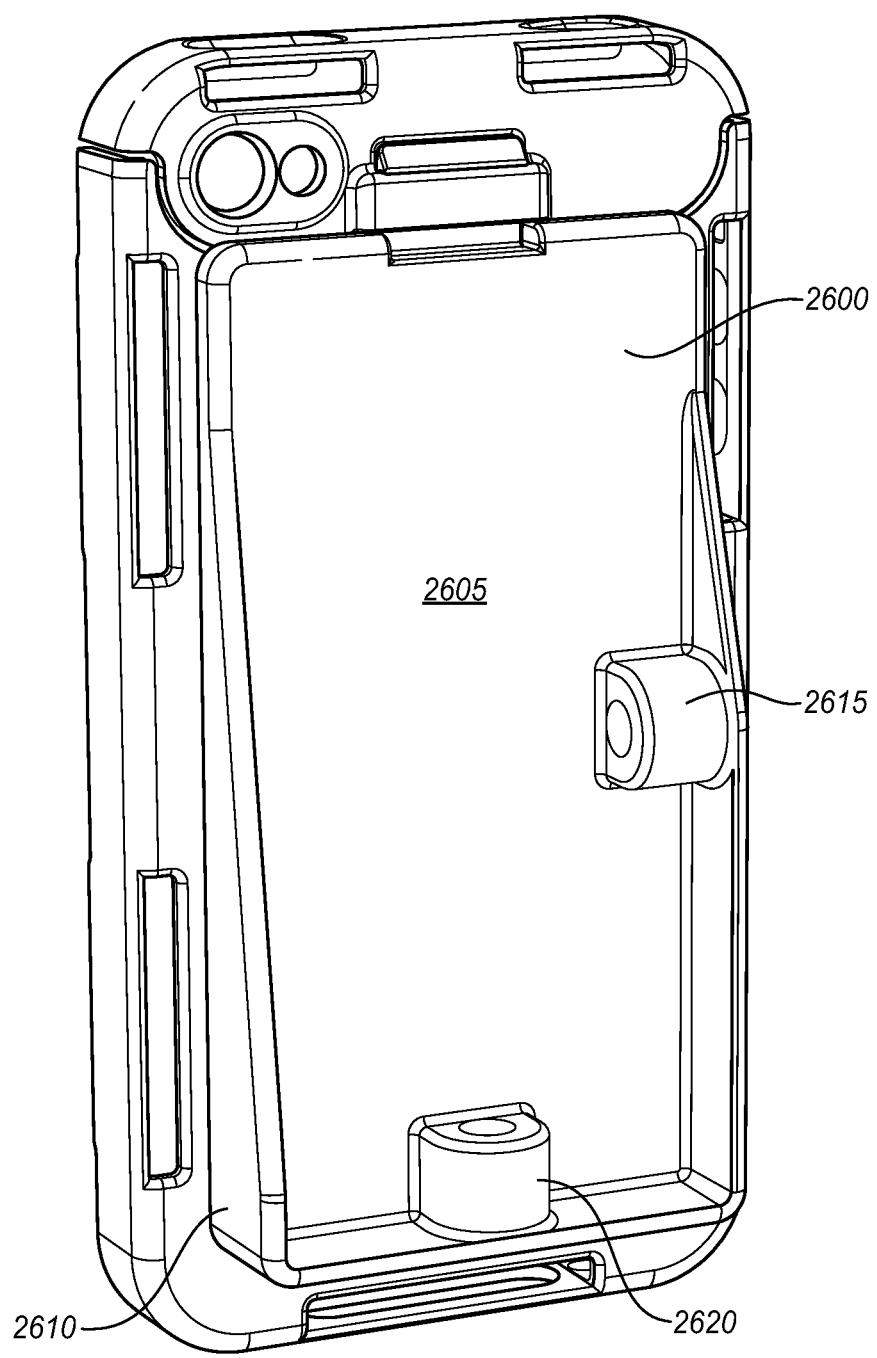
FIG. 26 shows an embodiment of an attachment for fitting with a tripod.

FIG. 25 shows another embodiment with a clip 2510 that may be found in co-pending U.S. patent application Ser. No. 12/327,563, which is hereby incorporated by reference. In one alternative, the rotating pieces of the clip are removed and a fixed clip is provided. FIG. 26 shows another embodiment of an attachment 2600 mounted on a case 700. Attachment 2600 includes various pieces similar to previous embodiments and includes a body 2605 having a raised edge 2610 for supporting tripod attachment apertures 2615 and 2620, apertures 2615 providing for landscape view and apertures 2620 providing for upright view.

Figure 27:
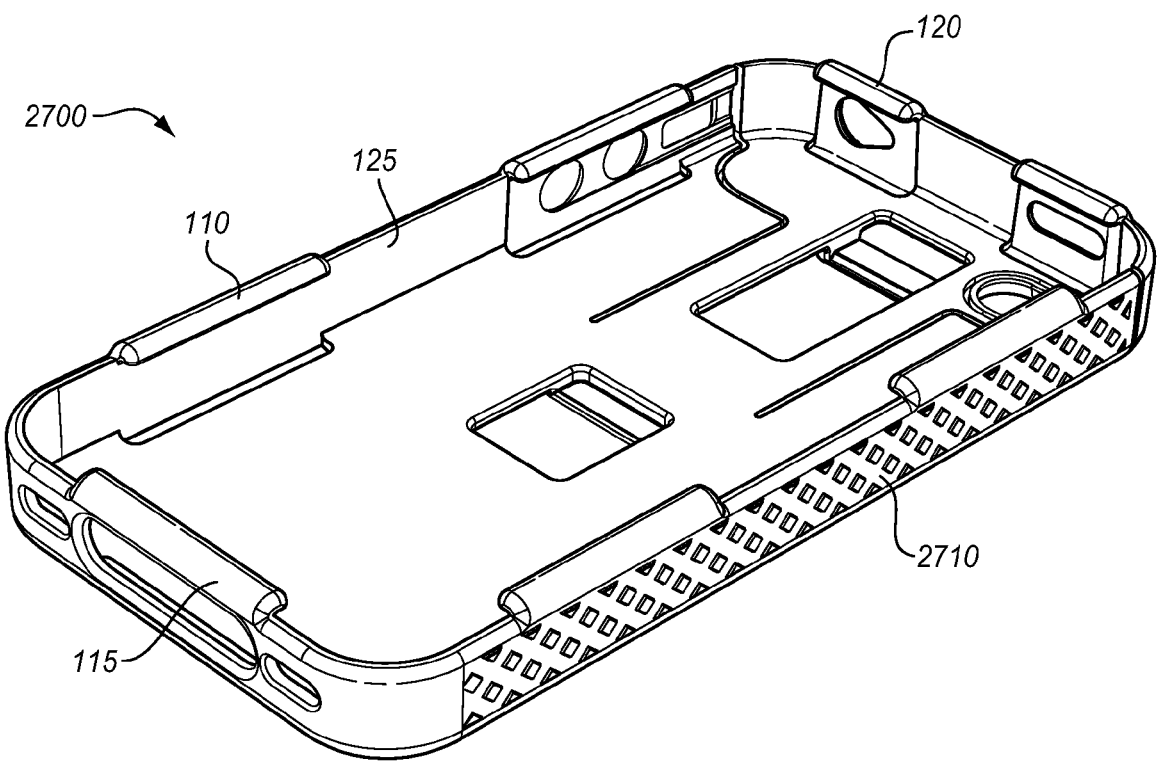
FIG. 27 shows a perspective view of one embodiment of a case with a flexible body portion.

FIG. 27 shows another embodiment of a case with a flexible body portion 2700, which is similar in many respects to the case with a flexible body portion 100 of FIGS. 1-3. Some of the similar parts are labeled in FIG. 27 and overall most parts are similar. Case 2700 also includes a diamond grip pattern 2710 on the sides of the case for an improved grip. Various other grip patterns or texturing may be used in alternatives.

Figure 7:
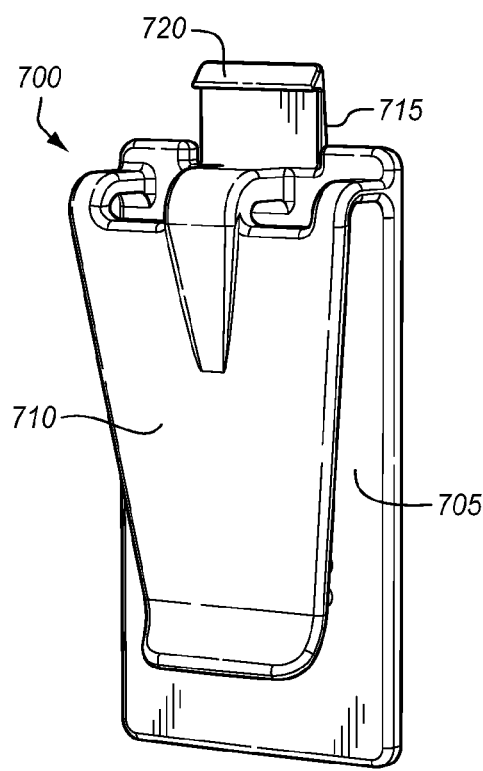
FIG. 7 shows a front perspective view of one embodiment of an attachment for a case.
Figure 8:
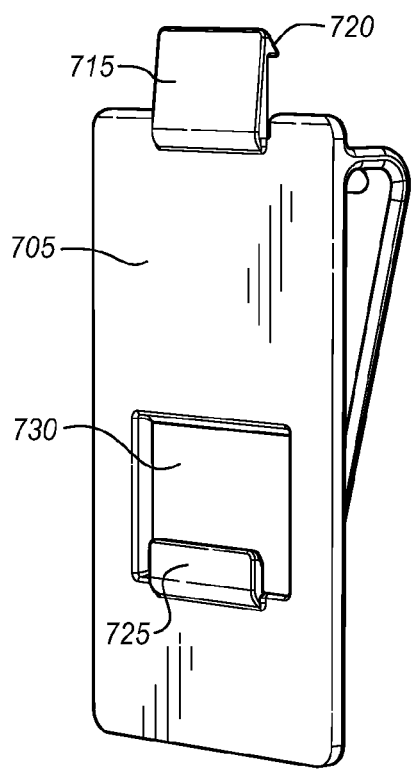
FIG. 8 shows a rear perspective view of the attachment of FIG. 7.
Figure 28:
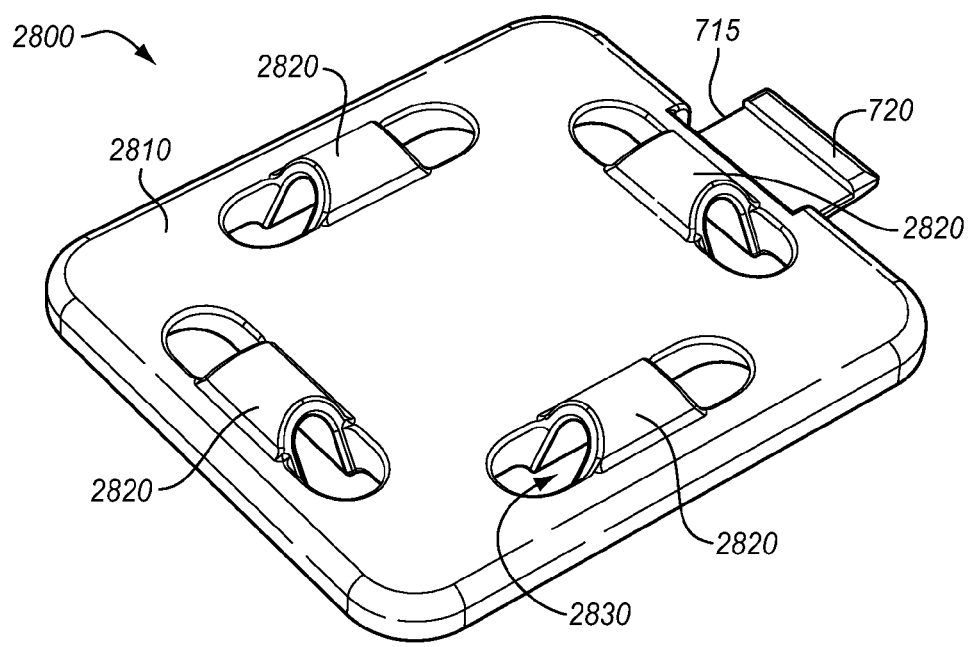
FIG. 28 shows another embodiment of an attachment for receiving gear ties or other flexible rods.
Figure 33:
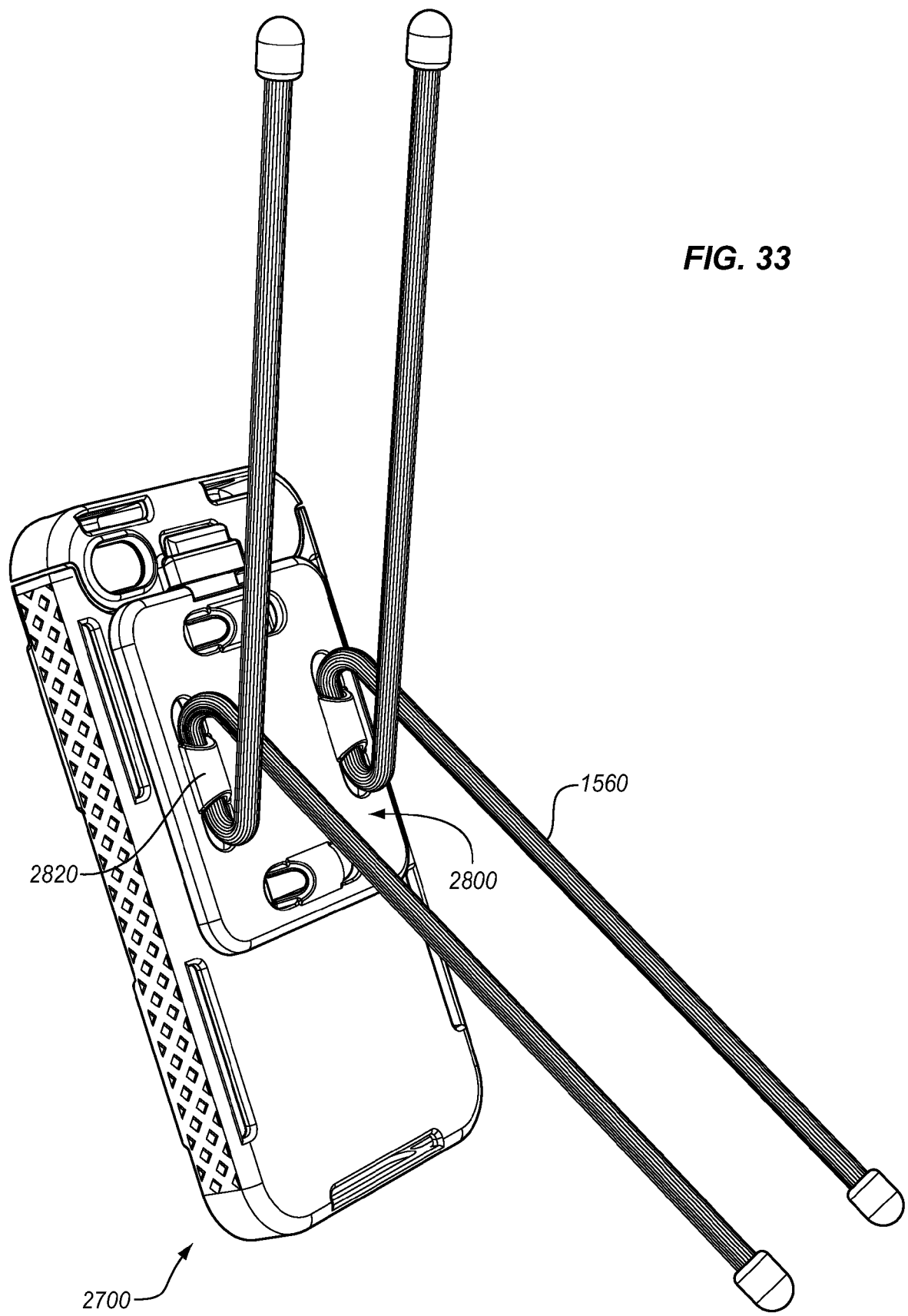
FIG. 33 shows the case of FIG. 27 integrated with the attachment of FIG. 28 including gear ties.
Figure 34:
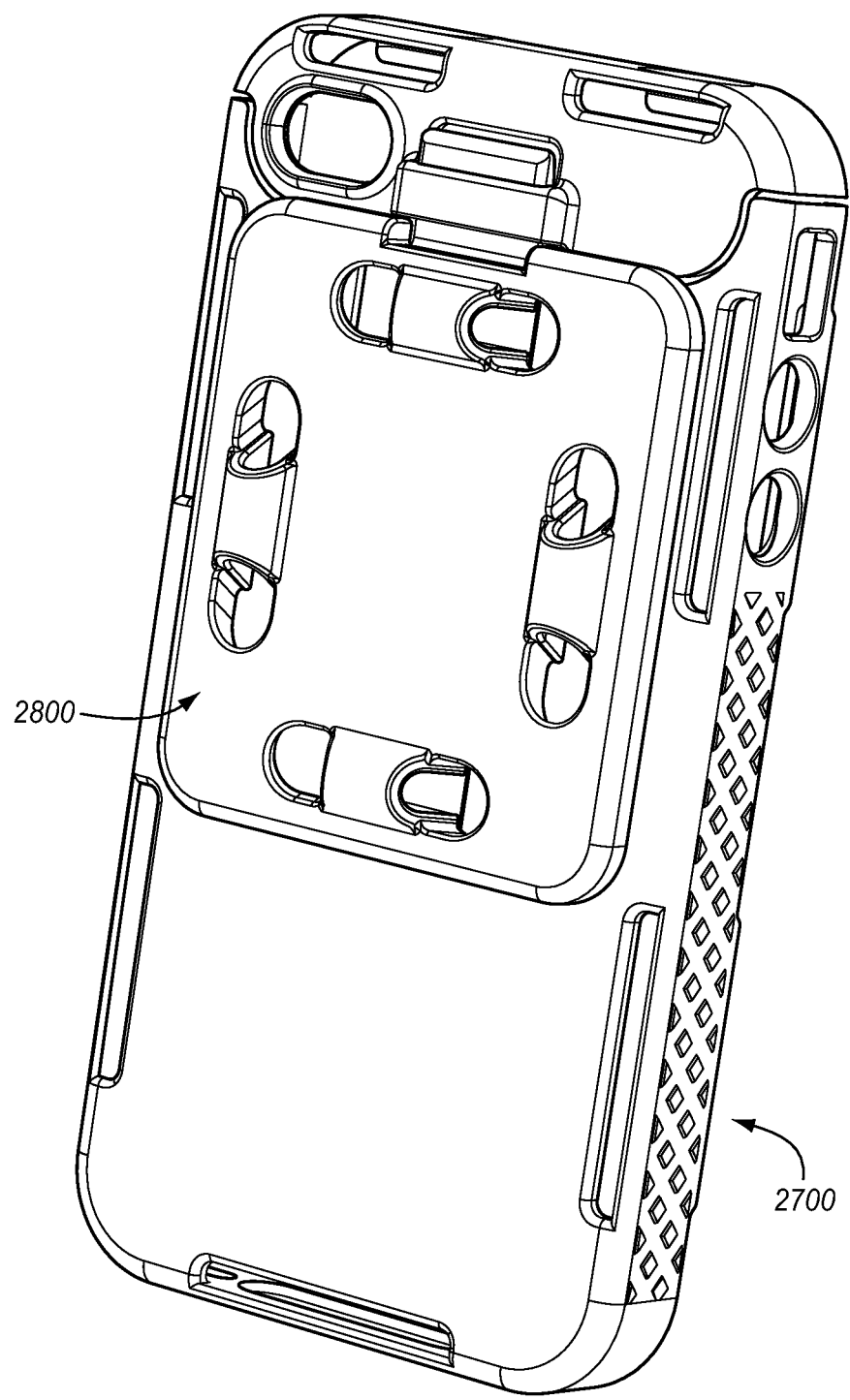
FIG. 34 shows the case of FIG. 27 integrated with the attachment of FIG. 28 without gear ties.
Figure 35:
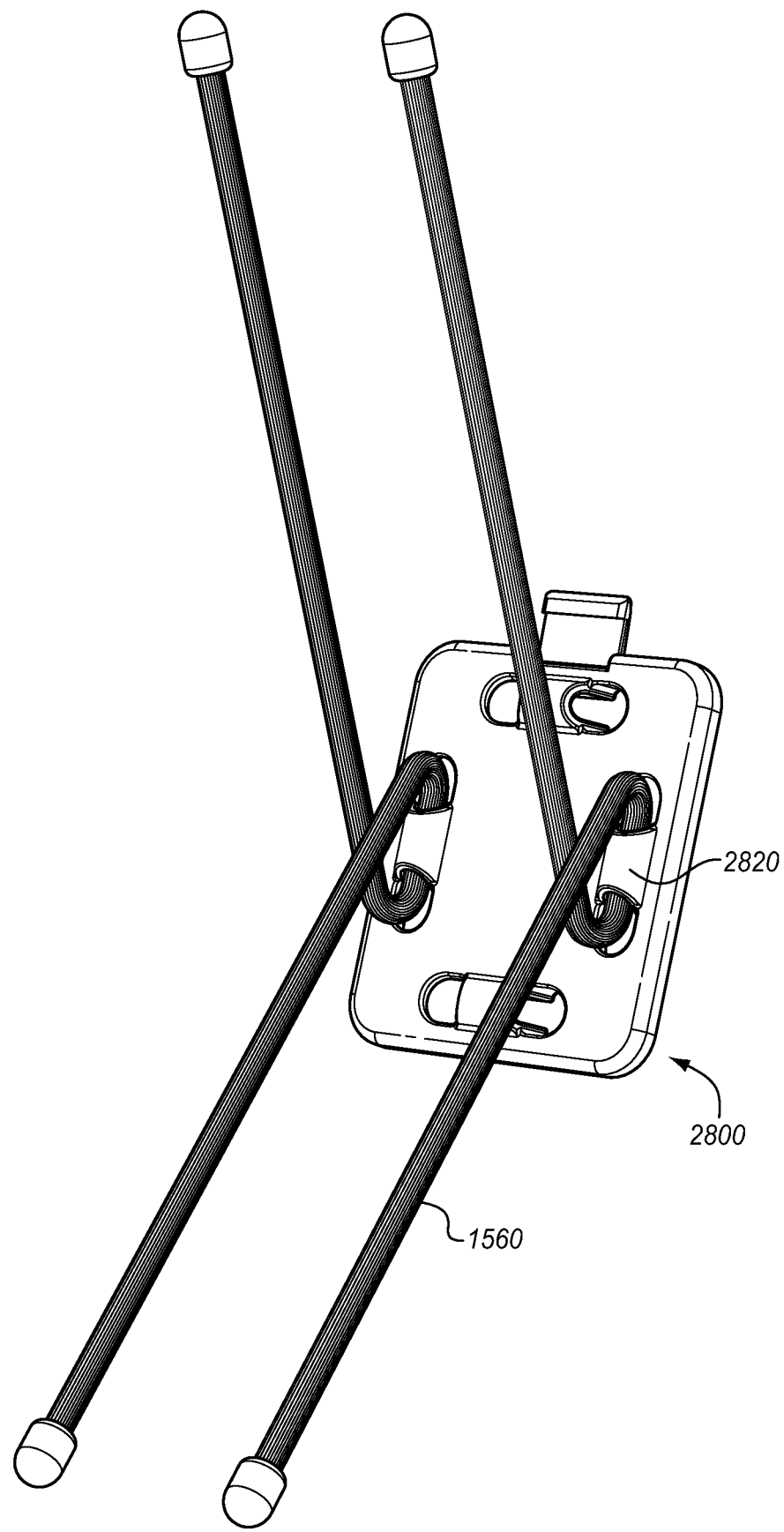
FIG. 35 shows the attachment of FIG. 28 including gear ties.

FIG. 28 shows an embodiment of an attachment, in this case a gear tie attachment 2800. Gear tie attachment 2800 includes a body 2810 and a plurality of gear tie holders 2820. Although 4 gear tie holders 2820 are shown, a different number either greater or smaller may be used in alternatives. This allows for the mounting of gear ties in two perpendicular positions. The gear tie attachment 2800 includes a first attachment tab 715 including a wedge 720 and a second attachment tab that is not shown since it is on the underside of the body 2810 in a similar arrangement as shown in FIG. 7. The aperture 2830 of gear tie holders 2820 is of a radius to accept a gear tie. In some alternatives the radius may be slightly less that that of a gear tie in order to hold the gear tie from sliding within the gear tie holder. FIG. 33 shows the gear tie attachment 2800 attached to case 2700 and including gear ties 1560, oriented in gear tie holders 2820. In this configuration, the gear ties may be used to attaché the phone to various objects, such as the handle bars of a bike, or anything that the gear ties may wrap around. FIG. 34 shows the gear tie attachment 2800 attached to case 2700 without gear ties. FIG. 35 shows the gear tie attachment 2800 with gear ties 1560.

Figure 31:
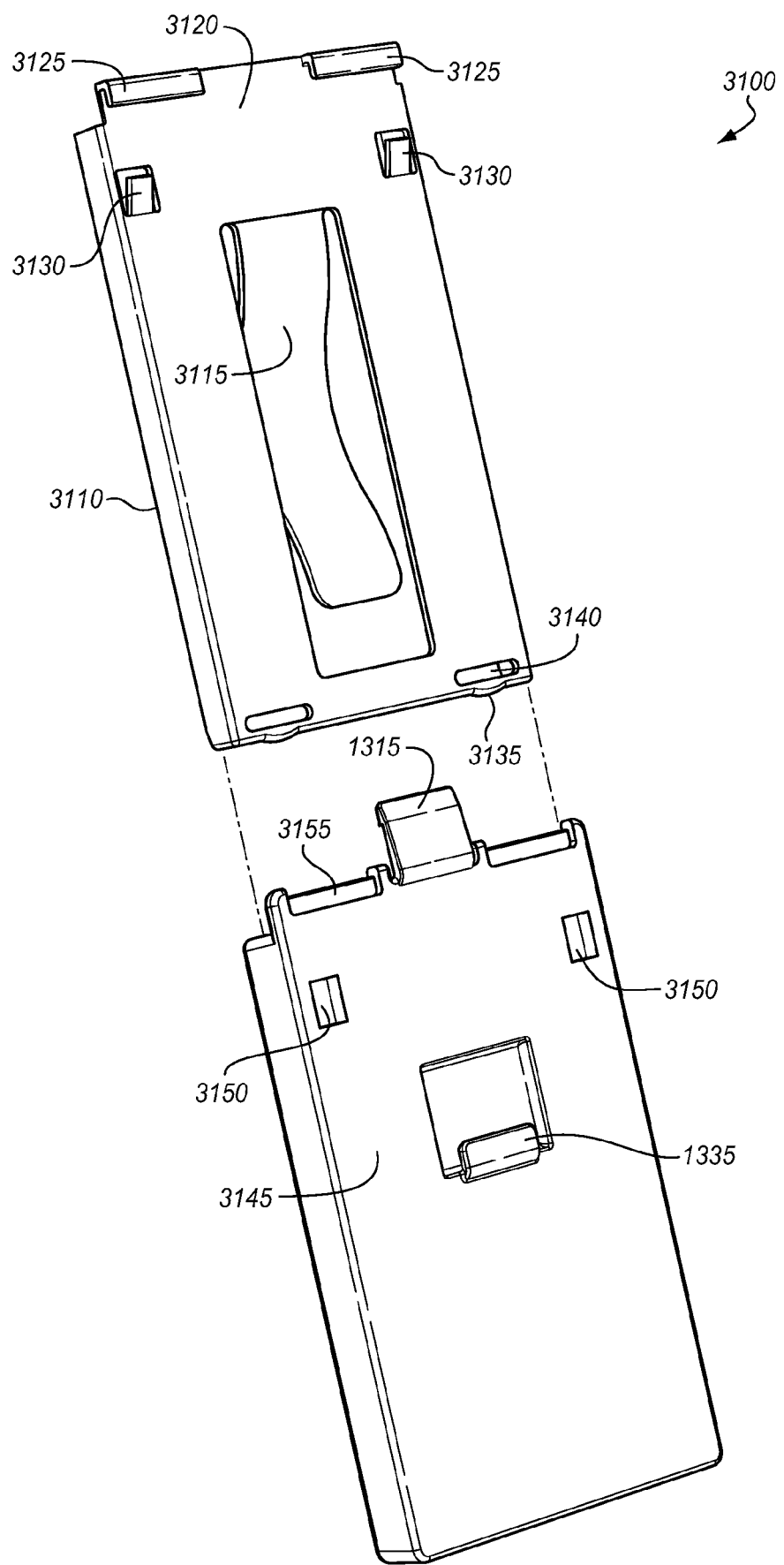
FIG. 31 shows an exploded view of one embodiment of an attachment member for holding credit cards.

FIG. 31 shows another show another embodiment of an attachment 3100 similar to that shown in FIGS. 13a and 13b. Case 3145 includes a first attachment tab 1315 including a wedge and a second attachment tab 1325. Case 3145 includes a rectangular slot oriented in the body. The rectangular slot is shaped and sized to hold credit cards or other cards. The attachment includes insert 1320. Insert 3120 has attachment tabs 3135 which have a cut out 3140 behind them to provide for flexibility. Tabs 3135 insert into holes at the bottom of case 3145. Insert 3120 also includes spring tabs 3130 and wide hooks 3125. Spring tabs 3130 fit into apertures 3150 when the insert 3120 is placed into case 3145. wide hooks 3125 fit over receiving area 3155. This configuration provides for a solid fit of insert 3120 into case 3145. Spring 3115 and side walls 3110 are designed to hold cards inserted into the rectangular slot. This configuration provides for a single mobile phone card carrying case combination.

Figure 32:
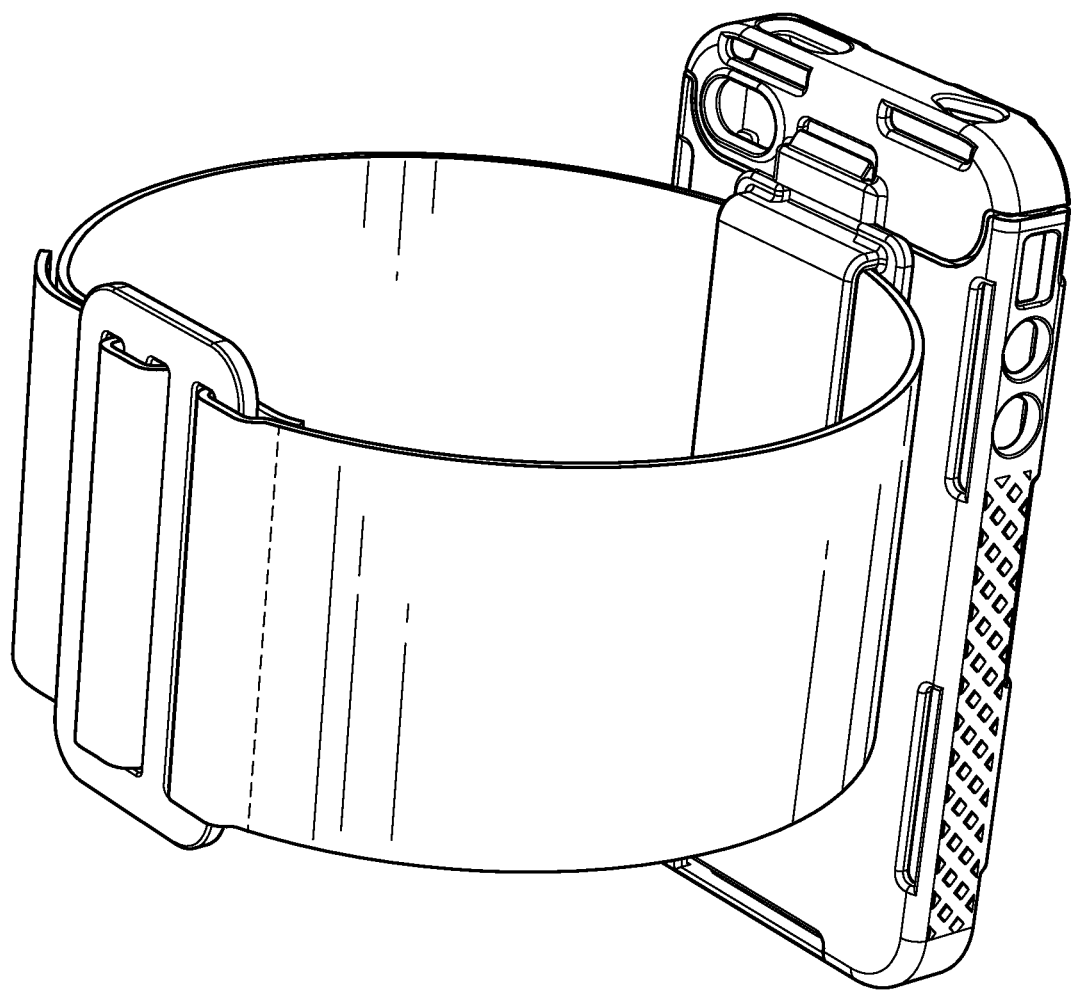
FIG. 32 show one embodiment of an attachment member with an integrated aperture for a strap.
Figure 36:
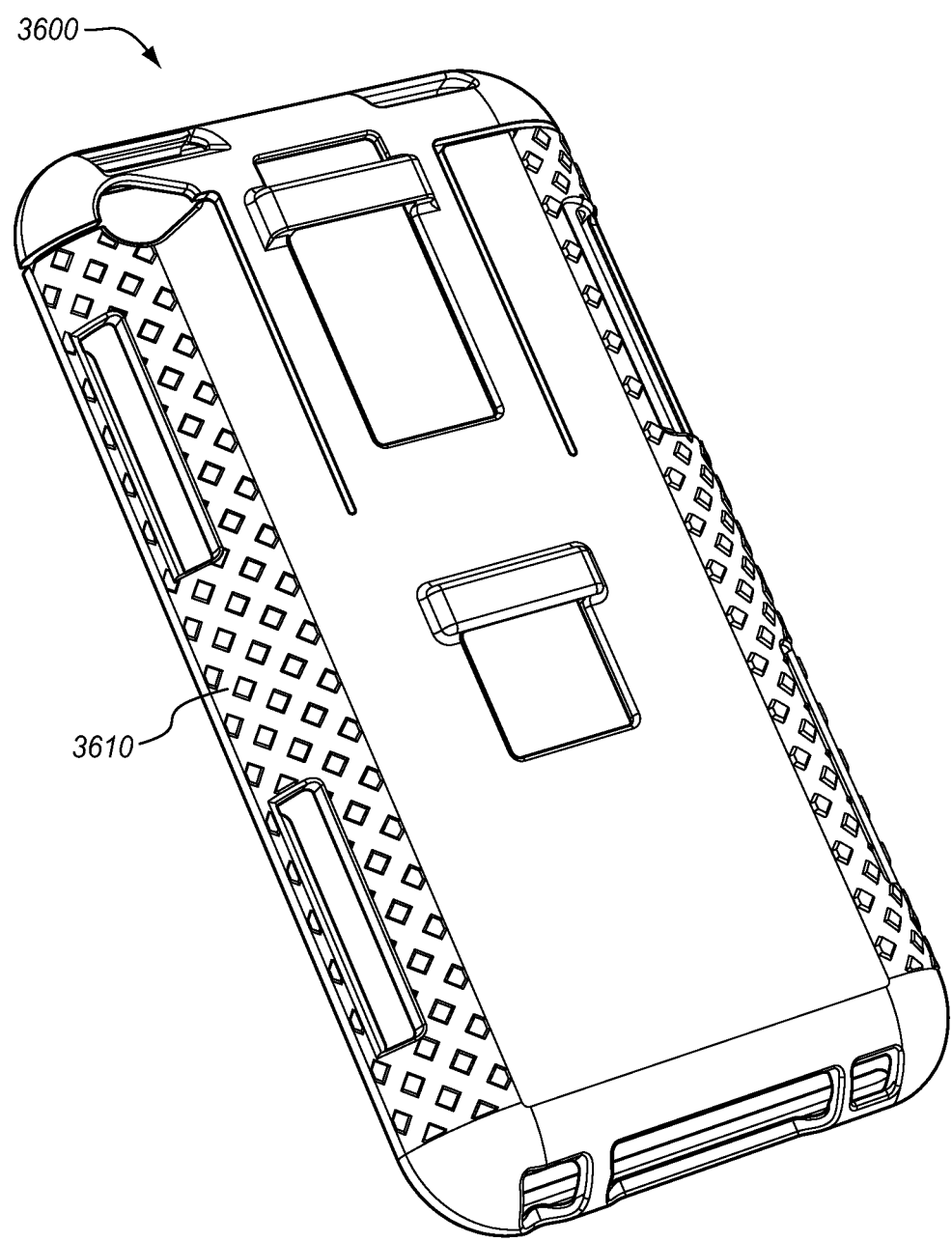
FIG. 36 shows an alternative embodiment of a case with a flexible body portion.

FIG. 32 shows an embodiment similar to that of FIG. 12 but with the case of FIG. 27. FIG. 36 shows another embodiment very similar to the case of FIG. 6. Most parts are similar. Case 3600 also includes a diamond grip pattern 3610 on the sides of the case for an improved grip. Various other grip patterns or texturing may be used in alternatives.

Figure 29:
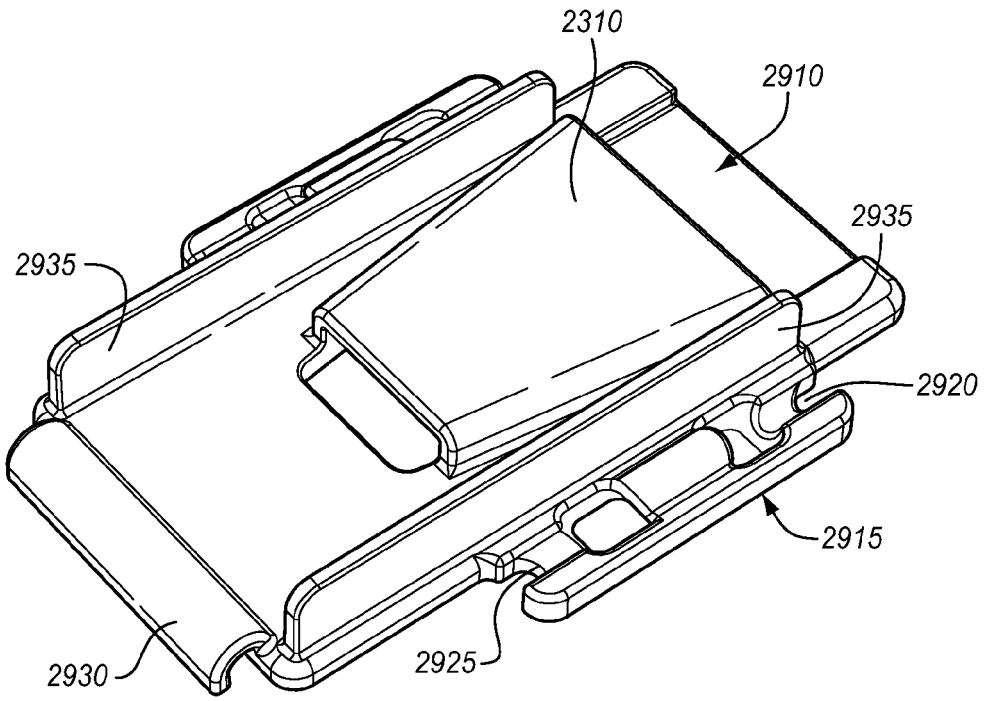
FIG. 29 shows a perspective view an embodiment of a receiving attachment, for receiving a clip, including attachment areas gear ties or other flexible rod.
Figure 30:
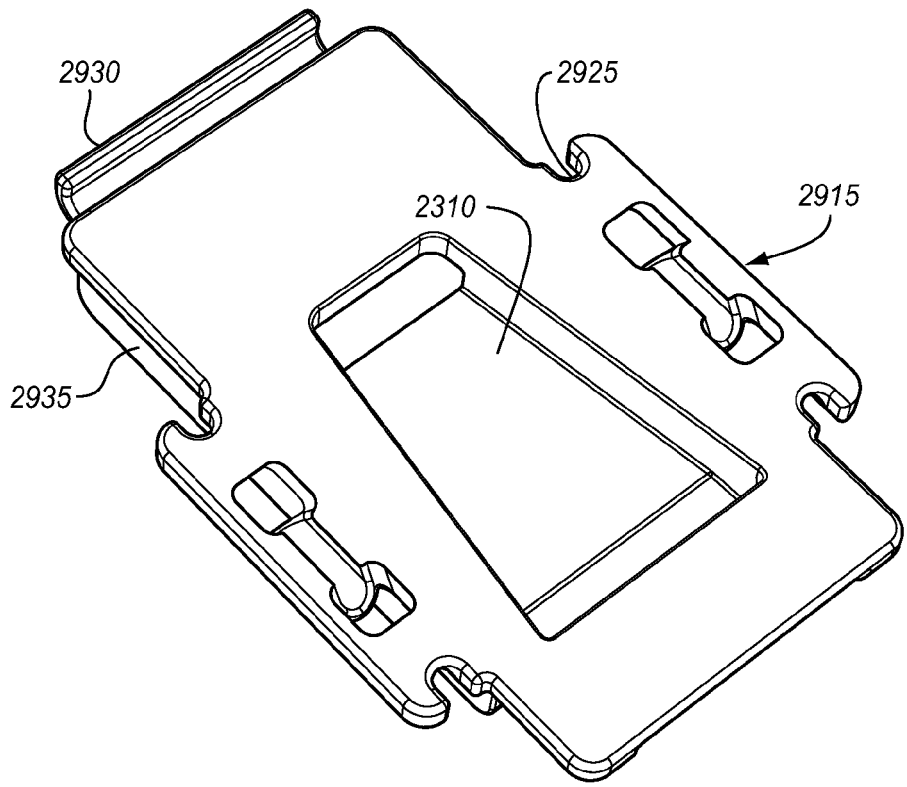
FIG. 30 shows a perspective view of the underside of the receiving attachment of FIG. 29.

FIGS. 29 and 30 show a receiving attachment for integrating with attachment 700 or similar attachment. Clip portion 710 is sized to integrate into clip aperture 2010 having opening 2910. In this embodiment, the receiving attachment includes gear tie supports 2915 which include an aperture 2920 for receiving and holding a gear tie, the radius of aperture 2920 being less that that of the main body of a gear tie in order to hold it firmly. The supports 2915 also include a lower support area 2925, which is similarly configured to hold a gear tie oriented in it. The receiving attachment further includes a lower aperture 2930 for receiving the gear tie having similar characteristics to aperture 2920. The back of the receiving attachment may also include an adhesive strip or other attachment mechanism for attaching to an object such as a dashboard. In alternatives, screws, Velcro or adhesive tape may also be used for example.

In one embodiment the attachment area has been removed to provide for a flat back which may allow for better display of graphics on the flat back portion. As is the case for allow embodiments described herein, the flat back aspect may be integrated into any of the cases described herein.

In one embodiment case 2700 has been fitted with attachment 2800 that includes gear ties 1560 oriented in slots 2820.

The flexibility, hold, and friction provided by the gear ties 1560 allows for the case 2700 to be mounted on almost any type of surface that the gear ties 1560 can wrap around. In this configuration the soft outer covering of the ties give and provide friction so that the case will not easily rotate. Twist point 3820 holds firmly. In this case cylinder 3810 is representative of a bike handle bars.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein, but is intended to cover modifications within the spirit and scope thereof as defined by the appended claims and any and all equivalents thereof. Note that, although particular embodiments are shown, features of each attachment may be interchanged between embodiments. In some embodiments, the cases shown may not include an attachment point for the various attachments included herein. Although the flexible body portion is shown in a specific configuration associated with the top of the case, a side flexible body potion may be used or a flexible body portion on any side the various cases shown. In some embodiments a rubber overmold may be added to the outer surface of the cases in order to provide for more drop/bump protection.

The invention claimed is:

1. A case for holding an electronic device, comprising:
a semi-rigid body having a rear face, a top sidewall, a bottom sidewall, a left sidewall, and a right sidewall, the top, bottom, left, and right sidewalls forming an approximately rectangular shape, the rear face being approximately perpendicular to the top, bottom, left, and right sidewalls and spanning between the top, bottom, left, and right sidewalls, the left and right sidewall having a first and second flexible body portion break, the first flexible body portion break beginning at a first edge of the right sidewall, the first edge distal from the rear face, the first flexible body portion break extending into the rear face through the right sidewall, the second flexible body portion break beginning at a second edge of the left sidewall, the second edge distal from the rear face, the second flexible body portion break extending into the rear face through the left sidewall, the first and second flexible body portion breaks forming a flexible body portion of the semi-rigid body including the top sidewall and having an attachment point that connects the flexible body portion to the semi-rigid body, configured to allow the flexible body portion to flex away from the rear face, and causing the top sidewall to un-align from the approximately rectangular shape;
wherein the semi-rigid body includes a first, second, and third aperture for receiving an attachment, the first, second, and third apertures located within the rear face, and the semi-rigid body includes a first and second attachment support member, the first attachment support member oriented between the first and second apertures, and the second attachment support member oriented proximate to the third aperture;
wherein the attachment includes a first and second attachment tab, the first attachment tab configured on the attachment to align with the first and second apertures such that a portion of the first attachment tab fits in the second aperture and is engaged by the first attachment support member, and the second attachment tab is configured on the attachment to align with the third aperture and engage the second attachment support member.

2. The case of claim 1 wherein the semi-rigid body includes top, bottom, left, and right tabs extending perpendicular from the top, bottom, left, and right sidewalls, respectively, distal from the rear face, the left and right tabs forming a guide configured to guide a first and second edge of the electronic device inserted into the case when the flexible body portion is flexed away from the rear face, the bottom tab configured to receive a third edge of the electronic device, the top tab configured to snap-fit over a fourth edge of the electronic device when the electronic device is placed in the case, and the flexible body portion is flexed back to align with the approximately rectangular shape.

3. The case of claim 2 wherein the semi-rigid body includes top, bottom, left, and right rear tabs extending perpendicular from the top, bottom, left, and right sidewalls, respectively, proximate to the rear face, the left and right tabs and the left and right rear tabs cooperating to form the guide.

4. The case of claim 2 wherein the left and right tabs and the rear face cooperate to form the guide.

5. The case of claim 1 wherein the semi-rigid body includes a plurality of apertures configured to provide access to parts of the electronic device.

6. The case of claim 1 wherein the semi-rigid body is a single piece of material.

7. The case of claim 1 wherein the portion of the first attachment support member is wedge-shaped such that, when advanced in the first aperture towards the first attachment tab, the portion wedges under the first attachment support member until it reaches the second aperture.

8. The case of claim 7 wherein the first attachment support and first and second apertures are configured such that, when the portion of the first attachment tab is depressed, the first attachment tab is slideable, and when the portion of the first attachment tab is protruding in the second aperture, the first attachment tab is not slideable.

9. The case of claim 1 wherein the attachment includes a clip.

10. The case of claim 1 wherein the attachment includes a carabineer.

11. The case of claim 1 wherein the attachment includes an arm band.

12. A case for holding an electronic device, the case comprising:
a body for holding the electronic device including a first, second, and third aperture for receiving an attachment, the first, second, and third apertures located within the rear face, and the body includes a first and second attachment support member, the first attachment support member oriented between the first and second apertures, and the second attachment support member oriented proximate to the third aperture, the attachment including a first and second attachment tab, the first attachment tab configured on the attachment to align with the first and second apertures such that a portion of the first attachment tab fits in the second aperture and is engaged by the first attachment support member, and the second attachment tab is configured on the attachment to align with the third aperture and engage the second attachment support member, wherein the portion of the first attachment tab is wedge-shaped such that, when advanced in the first aperture towards the first attachment tab, the portion wedges under the first attachment tab until it reaches the second aperture.

13. The case of claim 12 wherein the first attachment support member and first and second apertures are configured such that, when the portion of the first attachment tab is depressed, the first attachment tab is slideable, and when the portion of the first attachment tab is protruding in the second aperture, the first attachment tab is not slideable.

14. The case of claim 13, wherein the attachment includes a body and the body includes an aperture and a flexible rod oriented in the aperture, the aperture having a circular shape, with an open portion of the circumference less than one half of the total circumference, the circular shape having an inner radius of the aperture being approximately that of a radius of the flexible rod, such that the flexible rod is held in the aperture and is releasable from the aperture by compressing the flexible rod so that it fits through the open portion.

15. The case of claim 14 wherein the flexible rod has a wire core bonded to an outer soft and flexible material.

16. The case of claim 15, wherein the flexible rod is bendable and will hold a position in which the flexible rod is positioned.

17. The case of claim 16 wherein the attachment includes an elastic strap on the body.

18. The case of claim 12 wherein the first attachment support member and first and second apertures are configured such that, when the portion of the first attachment tab is depressed, the first attachment tab is slideable, and when the portion of the first attachment tab is protruding in the second aperture, the first attachment tab is not slideable, and the second attachment tab releases from the third aperture in a sliding fashion.

* * * * *